United States Patent
Yu et al.

(10) Patent No.: US 12,225,090 B2
(45) Date of Patent: *Feb. 11, 2025

(54) PACKET TRANSMISSION METHOD, COMMUNICATION APPARATUS, AND COMMUNICATION SYSTEM

(71) Applicant: HUAWEI TECHNOLOGIES CO., LTD., Shenzhen (CN)

(72) Inventors: Fang Yu, Shenzhen (CN); Yan Li, Beijing (CN); Ao Lei, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/344,655

(22) Filed: Jun. 29, 2023

(65) Prior Publication Data

US 2023/0421642 A1 Dec. 28, 2023

Related U.S. Application Data

(63) Continuation of application No. 17/827,539, filed on May 27, 2022, now Pat. No. 11,722,574, which is a
(Continued)

(51) Int. Cl.
*H04L 67/148* (2022.01)
*H04L 9/40* (2022.01)
*H04L 69/14* (2022.01)

(52) U.S. Cl.
CPC ........ *H04L 67/148* (2013.01); *H04L 63/0281* (2013.01); *H04L 63/166* (2013.01); *H04L 69/14* (2013.01)

(58) Field of Classification Search
CPC . H04L 67/148; H04L 63/0281; H04L 63/166; H04L 69/14
See application file for complete search history.

(56) References Cited

U.S. PATENT DOCUMENTS

2018/0270778 A1 9/2018 Bharatia
2019/0261260 A1 8/2019 Dao et al.

FOREIGN PATENT DOCUMENTS

| CN | 108462735 A | 8/2018 |
|---|---|---|
| CN | 109788078 A | 5/2019 |

(Continued)

OTHER PUBLICATIONS

O. Bonaventure, Ed et al., "0-RTT TCP Convert Protocol," draft-ietf-topm-converters-07, total 52 pages (Jun. 11, 2019).
(Continued)

*Primary Examiner* — Ryan J Jakovac
(74) *Attorney, Agent, or Firm* — Leydig, Voit & Mayer, Ltd.

(57) ABSTRACT

Embodiments of this application provide a packet transmission method, a communication apparatus, and a communication system. A target transport layer proxy network element establishes a fourth transport layer connection based on a first context of a source transport layer proxy network element, where the first context is a context about packet transmission of the source transport layer proxy network element on a first path. If the target transport layer proxy network element receives first indication information, and the first indication information indicates that application context migration between a first application server and a second application server is completed, the target transport layer proxy network element performs transport layer processing on a packet on a second path based on a second context of the target transport layer proxy network element, and transmits, on the second path, a packet obtained through the transport layer processing. Hence, a packet loss can be avoided.

20 Claims, 19 Drawing Sheets

Related U.S. Application Data continuation of application No. PCT/CN2019/122215, filed on Nov. 29, 2019.

(56) References Cited

FOREIGN PATENT DOCUMENTS

| | | |
|---|---|---|
| CN | 110192406 A | 8/2019 |
| WO | 2019027742 A1 | 2/2019 |

OTHER PUBLICATIONS

C. Huitema, "Multi-homed TCP," draft-huitema-multi-homed-0.txt, total 22 pages (May 1995).

"3rd Generation Partnership Project; Technical Specification Group Services and System Aspects; System Architecture for the 5G System (5GS); Stage 2 (Release 16)," 3GPP TS 23.501 V16.2.0, total 391 pages, 3rd Generation Partnership Project, Valbonne, France (Sep. 2019).

Huawei et al., "Update to procedures to support service continuity in ULCL scenario," SA WG2 Meeting #123, lubljana, slovenia, 3GPP Draft; S2-177429, Total 4 pages, 3rd Generation Partnership Project, Valbonne, France (Oct. 23-27, 2017).

Huawei et al., "Update to KI#3: Enhancement of Session Continuity during UE Mobility," 3GPP TSG-SA WG2 Meeting #127Bis, Newport Beach, USA, S2-185182, Total 2 pages, 3rd Generation Partnership Project, Valbonne, France (May 28-Jun. 1, 2018).

CATT, "Solution for KI3: Session continuity enhancement based on the coordination between AF and 5GC," 3GPP TSG-SA WG2 Meeting #128bis, Sophia Antipolis, France, S2-188201, Total 3 pages, 3rd Generation Partnership Project, Valbonne, France (Aug. 20-24, 2018).

NEC, "Updates to solution #6," SA WG2 Meeting #S2-129, Dongguan, P.R.China, 3GPP Draft; S2-1811384, Total 3 pages, 3rd Generation Partnership Project, Valbonne, France (Oct. 15-19, 2018).

"3rd Generation Partnership Project; Technical Specification Group Services and System Aspects; Procedures for the 5G System (5GS); Stage 2 (Release 16)," 3GPP TS 23.502 V16.2.0, Total 525 pages, 3rd Generation Partnership Project, Valbonne, France (Sep. 2019).

U.S. Appl. No. 17/827,539, filed May 27, 2022.

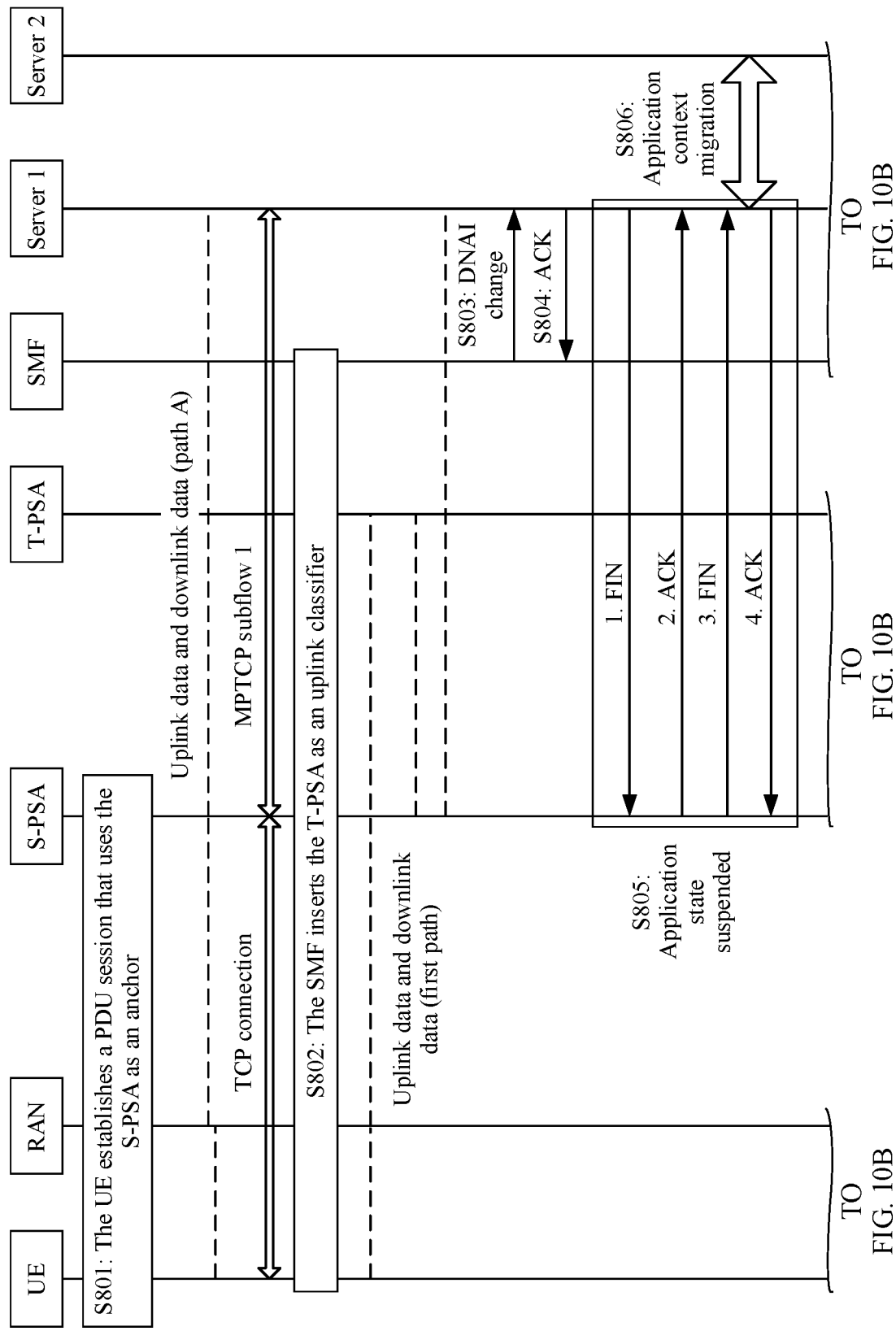

PACKET TRANSMISSION METHOD, COMMUNICATION APPARATUS, AND COMMUNICATION SYSTEM

CROSS-REFERENCE TO RELATED APPLICATIONS

This application is a continuation of U.S. patent application Ser. No. 17/827,539, filed on May 27, 2022, which is a continuation of International Application No. PCT/CN2019/122215, filed on Nov. 29, 2019. All of the afore-mentioned patent applications are hereby incorporated by reference in their entireties.

TECHNICAL FIELD

This application relates to the communication field, and in particular, to a packet transmission method, a communication apparatus, and a communication system.

BACKGROUND

In a communication system, when a terminal device moves from coverage of an original base station to coverage of a current base station, air interface handover is triggered, that is, the terminal device connected to a base station is handed over from the original base station to the current base station. Although a location of the terminal device changes, the terminal device still accesses an original user plane network element. However, in practice, a user plane network element closest to the terminal device may have changed, but the terminal device still performs packet transmission with the original user plane network element. In this case, a transmission path is long, and accordingly, a packet transmission delay increases. Consequently, user experience is affected. To reduce the packet transmission delay, the transmission path needs to be switched from the original user plane network element to a new user plane network element. Further, if data of the terminal device is still sent to an original server, a path detour still exists, and it is difficult to meet a low-delay requirement. Therefore, the server further needs to be relocated. Server relocation involves application context migration between servers. Currently, there is no appropriate method for regulating cooperation between application context migration between servers and path switching to avoid a packet loss.

SUMMARY

Embodiments of this application provide a packet transmission method, a communication apparatus, and a communication system, to implement seamless cooperation between path switching and application state context migration, to avoid a packet loss.

According to a first aspect, an embodiment of this application provides a packet transmission method, applied to a target transport layer proxy network element. The method includes: The target transport layer proxy network element establishes a fourth transport layer connection based on a first context of a source transport layer proxy network element, where the first context is a context about packet transmission of the source transport layer proxy network element on a first path. The target transport layer proxy network element further generates a second context of the target transport layer proxy network element based on the first context and a context of the fourth transport layer connection.

When the target transport layer proxy network element receives first indication information, and the first indication information is used to indicate that application context migration between a first application server and a second application server is completed, the target transport layer proxy network element performs transport layer processing on a packet on a second path based on the second context of the target transport layer proxy network element, and transmits, on the second path, a packet obtained through the transport layer processing. When the application context migration between the first application server and the second application server is being performed, packet transmission between the first application server and a transport layer proxy network element is stopped; and the transport layer proxy network element includes the source transport layer proxy network element or the target transport layer proxy network element.

The first path is a path established between a terminal device and the first application server, the first path includes a first transport layer connection and a second transport layer connection, the first transport layer connection is a transport layer connection between the source transport layer proxy network element and the terminal device. The second transport layer connection is a transport layer connection between the source transport layer proxy network element and the first application server. The second path includes a third transport layer connection and the fourth transport layer connection, the third transport layer connection is a transport layer connection between the target transport layer proxy network element and the terminal device, and the fourth transport layer connection is a transport layer connection between the target transport layer proxy network element and the second application server.

According to the method provided in this embodiment of this application, when the context migration between the first application server and the second application server is being performed, the packet transmission between the first application server and the transport layer proxy network element is stopped. The target transport layer proxy network element performs, only after the application context migration between the first application server and the second application server is completed, transport layer processing on the packet on the second path based on the second context, so that a packet loss caused during the context migration between the first application server and the second application server can be avoided.

In an embodiment, that the target transport layer proxy network element performs transport layer processing on a packet on a second path based on the second context of the target transport layer proxy network element; and transmits, on the second path, a packet obtained through the transport layer processing includes:

The target transport layer proxy network element receives a third uplink TCP packet sent by the terminal device; encapsulates the third uplink TCP packet into a third uplink MPTCP packet based on the second context of the target transport layer proxy network element; and sends the third uplink MPTCP packet to the second application server through the fourth transport layer connection.

The target transport layer proxy network element receives a third downlink MPTCP packet sent by the second application server; encapsulates the third downlink MPTCP packet into a third downlink TCP packet based on the second context of the target transport layer proxy network element; and sends the third downlink TCP packet to the terminal device through the third transport layer connection.

In an embodiment, the method further includes: The target transport layer proxy network element receives a first uplink TCP packet and a first downlink MPTCP packet from the source transport layer proxy network element, where the first uplink TCP packet is a packet that is received by the source transport layer proxy network element but that is not sent to the first application server, or a packet that is sent by the source transport layer proxy network element to the first application server but for which an acknowledgment message returned by the first application server is not received; and the first downlink MPTCP packet is a packet that is received by the source transport layer proxy network element but that is not sent to the terminal device, or a packet that is sent by the source transport layer proxy network element to the terminal device but for which an acknowledgment message returned by the terminal device is not received.

The target transport layer proxy network element encapsulates the first uplink TCP packet into a first uplink MPTCP packet based on the second context, and sends the first uplink MPTCP packet to the second application server through the fourth transport layer connection.

The target transport layer proxy network element encapsulates the first downlink MPTCP packet into a first downlink TCP packet based on the second context of the target transport layer proxy network element, and sends the first downlink TCP packet to the terminal device through the third transport layer connection.

Optionally, after completing, based on the second context, encapsulation of the first uplink TCP packet and the first downlink MPTCP packet that are sent by the source transport layer proxy network element, the target transport layer proxy network element performs transport layer processing on the packet on the second path based on the second context, that is, performs transport layer processing on the third uplink TCP packet and the third downlink MPTCP packet based on the second context. For details, refer to the descriptions of the foregoing embodiment, and the details are not described herein again.

According to the method provided in this embodiment, the first uplink TCP packet and the first downlink MPTCP packet are received from the source transport layer proxy network element, and the transport layer processing is performed on the first uplink TCP packet and the first downlink MPTCP packet based on the second context, where the second context is determined based on the first context of the source transport layer proxy network element and the context of the fourth transport layer connection. This ensures that the transport layer processing performed on a packet of the source transport layer proxy network element is not affected by the application context migration, so that a packet loss of the source transport layer proxy network element can be further avoided.

In an embodiment, the method further includes: The target transport layer proxy network element receives a notification message from a session management network element, where the notification message is used to indicate that the target transport layer proxy network element is to start performing transport layer processing on a packet, and optionally, the notification message includes the first context.

Optionally, the first context is sent by the source transport layer proxy network element to the session management network element.

In another embodiment, the first context may be synchronized between the source transport layer proxy network element and the target transport layer proxy network element, so that the target transport layer proxy network element obtains the first context of the source transport layer proxy network element.

In an embodiment, before the target transport layer proxy network element receives the first indication information, the target transport layer proxy network element performs transport layer processing on a packet on a third path based on the first context, and transmits, on the third path, a packet obtained through the transport layer processing. The third path may be a transition path during switching from the first path to the second path. The third path is a path established between the terminal device and the first application server, the third path includes the third transport layer connection and a fifth transport layer connection, the fifth transport layer connection is a transport layer connection between the target transport layer proxy network element and the first application server, and the fifth transport layer connection passes through the source transport layer proxy network element.

If the target transport layer proxy network element receives second indication information sent by the first application server, the target transport layer proxy network element stops sending data to the first application server, where the second indication information is sent when the first application server is to start performing application context migration between the first application server and the second application server. Alternatively, the second indication information indicates that the target transport layer proxy network element stops sending data to the first application server, the second indication information indicates that the application context migration between the first application server and the second application server is started, and so on. This is not limited in this embodiment of this application.

According to the packet transmission method in this embodiment, when the target transport layer proxy network element stops sending the data to the first application server, the application context migration is performed between the first application server and the second application server to avoid the packet loss during the application context migration, where the third path is used as the transition path. The target transport layer proxy network element performs transport layer processing on the packet on the third path based on the first context, and starts performing packet transmission on the second path after the application context migration between the first application server and the second application server is completed. That is, while the second application server establishes the fourth transport layer connection, the first application server still performs packet transmission, so that a transmission delay caused by the application context migration is reduced.

In an embodiment, that the target transport layer proxy network element performs transport layer processing on a packet on a third path based on the first context, and transmits, on the third path, a packet obtained through the transport layer processing includes:

The target transport layer proxy network element receives a fourth uplink TCP packet sent by the terminal device; encapsulates the fourth uplink TCP packet into a fourth uplink MPTCP packet based on the first context of the source transport layer proxy network element; and sends the fourth uplink MPTCP packet to the first application server through the fifth transport layer connection via the source transport layer proxy network element.

The target transport layer proxy network element receives a fourth downlink MPTCP packet forwarded by the source transport layer proxy network element; encapsulates the fourth downlink MPTCP packet into a fourth downlink TCP packet based on the first context of the source transport layer proxy network element; and sends the fourth downlink TCP packet to the terminal device through the third transport layer connection.

In an embodiment, the method further includes: The target transport layer proxy network element receives a second uplink TCP packet and a second downlink MPTCP packet from the source transport layer proxy network element, where the second uplink TCP packet is a packet that is received by the source transport layer proxy network element but that is not sent to the first application server, or an uplink packet that is sent by the source transport layer proxy network element to the first application server but for which an acknowledgment message is not received; and the second downlink MPTCP packet is a packet that is received by the source transport layer proxy network element but that is not sent to the terminal device, or a downlink packet that is sent by the source transport layer proxy network element to the terminal device but for which an acknowledgment message is not received.

The target transport layer proxy network element encapsulates the second uplink TCP packet into a second uplink MPTCP packet based on the first context, and sends the second uplink MPTCP packet to the first application server through the fifth transport layer connection via the source transport layer proxy network element.

The target transport layer proxy network element encapsulates the second downlink MPTCP packet into a second downlink TCP packet based on the first context, and sends the second downlink TCP packet to the terminal device through the third transport layer connection.

According to the packet transmission method in this embodiment, the second uplink TCP packet and the second downlink MPTCP packet of the source transport layer proxy network element are sent to the target transport layer proxy network element for the transport layer processing, and the packet obtained through the transport layer processing is transmitted to the first application server on the third path, so that the packet loss caused during the application context migration can be avoided.

In an embodiment, the first context includes a first transport layer connection parameter and a second transport layer connection parameter. The first transport layer connection parameter and the second transport layer connection parameter are used to perform transport layer processing.

Alternatively, the first context includes a first transport layer connection parameter, a first transmission state parameter, a second transport layer connection parameter, and a second transmission state parameter. The first transport layer connection parameter and the second transport layer connection parameter are used to perform transport layer processing, the first transmission state parameter is used to indicate a packet transmission state of the first transport layer connection, and the second transmission state parameter is used to indicate a packet transmission state of the second transport layer connection.

According to a second aspect, an embodiment of this application provides a packet transmission method, applied to a source transport layer proxy network element. The method includes: If the source transport layer proxy network element receives third indication information, the source transport layer proxy network element stops performing transport layer processing on a packet on a first path based on a first context of the source transport layer proxy network element, where the first context is a context about packet transmission of the source transport layer proxy network element on the first path.

The first context is used by a target transport layer proxy network element to establish a fourth transport layer connection. When receiving first indication information, the target transport layer proxy network element performs transport layer processing on a packet on a second path based on a second context of the target transport layer proxy network element, where the second context is determined based on the first context and a context of the fourth transport layer connection, and the first indication information is used to indicate that application context migration between a first application server and a second application server is completed, where when the application context migration is being performed, packet transmission between the first application server and a proxy network element is stopped; and the proxy network element includes the source transport layer proxy network element or the target transport layer proxy network element.

The first path is a path established between a terminal device and the first application server, the first path includes a first transport layer connection and a second transport layer connection, the first transport layer connection is a transport layer connection between the source transport layer proxy network element and the terminal device, and the second transport layer connection is a transport layer connection between the source transport layer proxy network element and the first application server. The second path includes a third transport layer connection and the fourth transport layer connection, the third transport layer connection is a transport layer connection between the target transport layer proxy network element and the terminal device, and the fourth transport layer connection is a transport layer connection between the target transport layer proxy network element and the second application server.

According to the method in this embodiment of this application, when receiving the third indication information, the source transport layer proxy network element stops performing transport layer processing on the packet on the first path based on the first context, so that a function of the transport layer processing is migrated to the target transport layer proxy network element, and the application context migration between the first application server and the second application server is implemented.

In an embodiment, the source transport layer proxy network element determines that the source transport layer proxy network element has stopped performing transport layer processing on a packet; determines that the target transport layer proxy network element has started performing transport layer processing on a packet; and sends a migration complete instruction to a session management network element, where the migration complete instruction is used by the session management network element to trigger the application context migration between the first application server and the second application server.

In this embodiment, the source transport layer proxy network element first stops performing transport layer processing on a packet, and the target transport layer proxy network element starts performing transport layer processing on a packet, and then the application context migration is performed, so that a transmission delay caused during the application context migration is reduced.

In an embodiment, before the source transport layer proxy network element stops performing transport layer processing on the packet on the first path based on the first context, the source transport layer proxy network element further detects whether a third uplink packet is an uplink MPTCP packet, where the third uplink packet is an uplink packet sent by the target transport layer proxy network element to the first application server via the source transport layer proxy network element. If determining that the third uplink packet is the uplink MPTCP packet, the source transport layer proxy network element stops performing transport layer processing on the packet on the first path.

Through implementation of this embodiment, a packet loss caused because the transport layer processing is not performed on a packet that is sent by the target transport layer proxy network element before the target transport layer proxy network element starts performing transport layer processing, may be avoided, so that it is ensured that the transport layer processing is performed on each packet.

In an embodiment, the source transport layer proxy network element sends a first uplink TCP packet and a first downlink MPTCP packet to the target transport layer proxy network element for the transport layer processing, where the first uplink TCP packet is a packet that is received by the source transport layer proxy network element but that is not sent to the first application server, or an uplink packet that is sent by the source transport layer proxy network element to the first application server but for which an acknowledgment message is not received; and the first downlink MPTCP packet is a packet that is received by the source transport layer proxy network element but that is not sent to the terminal device, or a downlink packet that is sent by the source transport layer proxy network element to the terminal device but for which an acknowledgment message is not received.

In an embodiment, before that the source transport layer proxy network element sends a first uplink TCP packet and a first downlink MPTCP packet to the target transport layer proxy network element, the method further includes:

If the source transport layer proxy network element receives fourth indication information, the source transport layer proxy network element stops sending data to the first application server, where the fourth indication information is sent when the first application server is to start performing application context migration between the first application server and the second application server.

Before the application context migration is performed, the packet transmission between the source transport layer proxy network element and the first application server is stopped, to ensure that no packet is lost during the application context migration.

In an embodiment, the method further includes: The source transport layer proxy network element sends the first context to the session management network element. The source transport layer proxy network element may send the first context to the session management network element when the application context migration needs to be performed. Alternatively, the source transport layer proxy network element may send the first context to the session management network element after establishing the second transport layer connection with the first application server.

According to a third aspect, an embodiment of this application provides a packet transmission method, applied to a session management network element. The method includes: The session management network element determines that application context migration between a first application server and a second application server is required.

The session management network element indicates a source transport layer proxy network element to stop performing transport layer processing on a packet, and indicates a target transport layer proxy network element to start performing transport layer processing on a packet.

It may be understood that the foregoing method may alternatively be controlled and performed by a control plane. To be specific, the control plane determines that the application context migration between the first application server and the second application server needs to be performed; indicates the source transport layer proxy network element to stop performing transport layer processing on a packet; and indicates the target transport layer proxy network element to start performing transport layer processing on a packet. This is not limited in embodiments of this application.

In an embodiment, that the session management network element indicates a source transport layer proxy network element to stop performing transport layer processing on a packet, and indicates a target transport layer proxy network element to start performing transport layer processing on a packet includes:

The session management network element sends a notification message to the target transport layer proxy network element, where the notification message is used to indicate that the target transport layer proxy network element is to start performing transport layer processing on a packet. Optionally, the notification message may further include a first context of the source transport layer proxy network element.

The session management network element sends a deactivation instruction to the source transport layer proxy network element, where the deactivation instruction is used to indicate that the source transport layer proxy network element is to stop performing transport layer processing on a packet.

In an embodiment, before that the session management network element sends a deactivation instruction to the source transport layer proxy network element, the method further includes:

The session management network element receives an acknowledgment instruction for the notification message, where the acknowledgment instruction is used to indicate that the target transport layer proxy network element acknowledges that the transport layer processing on a packet has been started.

In this embodiment, the session management network element indicates, only after determining that the target transport layer proxy network element has started performing transport layer processing on a packet, the source transport layer proxy network element to stop performing transport layer processing on a packet, so that it is ensured that the transport layer processing is performed on each packet.

In an embodiment, the method further includes: If the session management network element receives a migration complete instruction sent by the source transport layer proxy network element, the session management network element sends an application migration instruction to the first application server, where the application migration instruction is used to indicate to perform application context migration between the first application server and the second application server, and the migration complete instruction is used to indicate that the source transport layer proxy network element has stopped performing transport layer processing on a packet and that the target transport layer proxy network element has started performing transport layer processing on a packet.

According to a fourth aspect, an embodiment of this application provides a communication apparatus, including modules or units configured to perform the method according to any embodiment of the first aspect to the third aspect.

According to a fifth aspect, a communication apparatus is provided, including a processor. The processor is coupled to a memory, and may be configured to execute instructions in the memory, to implement the method according to any embodiment of the first aspect to the third aspect. Optionally, the communication apparatus further includes the memory. Optionally, the communication apparatus further includes a communication interface, and the processor is coupled to the communication interface.

According to a sixth aspect, a processor is provided, including an input circuit, an output circuit, and a processing circuit. The processing circuit is configured to: receive a signal through the input circuit; and transmit a signal through the output circuit, so that the processor is enabled to perform the method according to any embodiment of the first aspect to the third aspect.

In an embodiment, the processor may be one or more chips, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to a seventh aspect, a processing apparatus is provided, including a processor and a memory. The processor is configured to: read instructions stored in the memory; receive a signal via a receiver; and transmit a signal via a transmitter, to perform the method according to any embodiment of the first aspect to the third aspect.

Optionally, there are one or more processors and one or more memories.

Optionally, the memory may be integrated into the processor, or the memory and the processor may be separately disposed.

In an embodiment, the memory may be a non-transitory memory, for example, a read-only memory (ROM). The memory and the processor may be integrated on a same chip, or may be separately disposed on different chips. A type of the memory and a manner of disposing the memory and the processor are not limited in embodiments of this application.

It should be understood that, a related data exchange process, for example, sending of indication information, may be a process of outputting the indication information from the processor, and receiving of indication information may be a process of receiving the indication information by the processor. Specifically, data output by the processor may be output to the transmitter, and input data received by the processor may be from the receiver. The transmitter and the receiver may be collectively referred to as a transceiver.

The processing apparatus in the seventh aspect may be one or more chips. The processor in the processing apparatus may be implemented by hardware, or may be implemented by software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor and exist independently.

According to an eighth aspect, a computer program product is provided. The computer program product includes a computer program (which may also be referred to as code or instructions). When the computer program runs, a computer is enabled to perform the method according to any embodiment of the first aspect to the third aspect.

According to a ninth aspect, a computer-readable medium is provided. The computer-readable medium stores a computer program (which may also be referred to as code or instructions). When the computer program runs on a computer, the computer is enabled to perform the method according to any embodiment of the first aspect to the third aspect.

According to a tenth aspect, a communication system is provided, including the foregoing source transport layer proxy network element, target transport layer proxy network element, first application server, and second application server.

Optionally, the communication system may further include the foregoing session management network element.

Optionally, the communication system may further include the foregoing terminal device.

According to an eleventh aspect, a chip system is provided. The chip system includes a processor and an interface. The processor is configured to invoke, from a memory, a computer program (which may also be referred to as code or instructions) stored in the memory and run the computer program, to implement a function according to any embodiment of the first aspect to the third aspect. In an embodiment, the chip system further includes a memory, and the memory is configured to store necessary program instructions and necessary data. The chip system may include a chip, or may include a chip and another discrete component.

BRIEF DESCRIPTION OF DRAWINGS

FIG. 10A and FIG. 10B are a schematic flowchart of a packet transmission method according to an embodiment of this application;

DESCRIPTION OF EMBODIMENTS

Before embodiments of this application are described, the following first describes names or terms in embodiments of this application.

Technical solutions in embodiments of this application may be applied to various communication systems, for example, a long term evolution (LTE) system, a universal mobile telecommunications system (UMTS), a 5th generation (5G) system, a new radio (NR) system, and another new system emerging with development of technologies.

Figure 1:
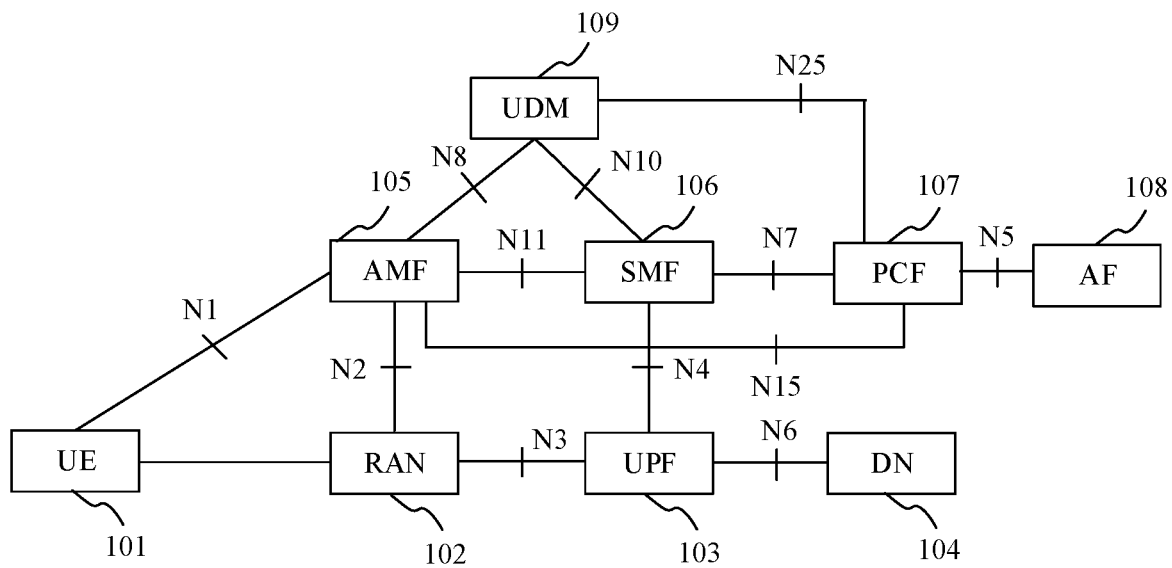
FIG. 1 is a diagram of an architecture of a 5G system according to an embodiment of this application.

FIG. 1 is a schematic diagram of a 5G system to which this application is applicable. As shown in FIG. 1, the system may be divided into two parts: an access network and a core network. The access network is configured to implement a function related to radio access, and mainly includes a radio access network (RAN) device 102. The core network mainly includes the following a plurality of key logical network elements: a user plane function 103, an access and mobility management function (AMF) 105, a session management function 106, a policy control function (PCF) 107, and a unified data management function 109. The system 100 may further include user equipment (UE) 101, a data network (DN) 104, and an application function (AF) 108. Interfaces between the network elements are shown in FIG. 1. It should be understood that the network elements may alternatively communicate with each other through a service-oriented interface.

UE: The UE may also be referred to as a terminal device. The terminal device may communicate with one or more core networks (CNs) via a RAN device. The terminal device may also be referred to as an access terminal, a terminal, a subscriber unit, a subscriber station, a mobile station, a remote station, a remote terminal, a mobile device, a user terminal, a wireless network device, a user agent, or a user apparatus. The terminal may be a cellular phone, a cordless phone, a session initiation protocol (SIP) phone, a wireless local loop (WLL) station, a personal digital assistant (PDA), a handheld device having a wireless communication function, a computing device, another device connected to a wireless modem, a vehicle-mounted device, a wearable device, a terminal device in internet of things, a terminal device in internet of vehicles, a terminal device in any form in a future network, or the like.

RAN device: The RAN device is a device that connects a terminal device to a wireless network, and may be specifically a base station. The base station may include base stations in various forms such as a macro base station, a micro base station (which is also referred to as a small cell), a relay station, and an access point. The base station may be specifically an access point (AP) in a wireless local area network (WLAN), a base transceiver station (BTS) in a global system for mobile communications (GSM) or code division multiple access (CDMA), a NodeB (NB) in wideband code division multiple access (WCDMA), an evolved NodeB (eNB or eNodeB), a relay station, an access point, a vehicle-mounted device, or a wearable device in LTE, a next generation NodeB (gNB) in a 5G system, a base station in a future evolved public land mobile network (PLMN), or the like. For ease of description, the RAN devices are collectively referred to as base stations in all the embodiments of this application.

UDM: The UDM has functions such as managing subscription data of a user and generating authentication information of the user.

AMF: The AMF is mainly responsible for functions such as registration management of the UE, connection management of the UE, reachability management of the UE, access authorization and access authentication of the UE, a security function of the UE, mobility management of the UE, network slice selection, and SMF selection. The AMF serves as an anchor of an N1/N2 interface signaling connection, provides the SMF with routing of an N1/N2 interface session management (SM) message, and maintains and manages state information of the UE.

SMF: The SMF is mainly responsible for all control plane functions in UE session management. The control plane functions include UPF selection and control, internet protocol (IP) address assignment and management, quality of service (QoS) management of a session, and obtaining of a policy and charging control (PCC) policy from a PCF. The SMF also serves as a termination of an SM part in a non-access stratum (NAS) message.

PCF: The PCF has functions such as providing a policy rule for a control plane functional entity.

AF: The AF may be an application server that may belong to an operator or a third party.

UPF: The UPF is mainly responsible for processing a user packet, for example, forwarding and charging. The UPF may serve as an anchor of a protocol data unit (PDU) session connection, namely, a PDU session anchor (PSA), and is responsible for data packet filtering, data transmission/forwarding, rate control, charging information generation, user plane QoS processing, uplink transmission authentication, transmission class verification, downlink data packet buffering, downlink data notification triggering, and the like of the UE. The UPF may also serve as a branching point of a multi-homed PDU session.

DN: The DN is a network that provides a data transmission service, for example, an IP multimedia service (IMS) or the Internet, for a user. The DN may include an application server (AS). The AS is a software framework, provides an environment in which an application program runs, and is configured to provide the application program with services such as security, data, transaction support, load balancing, and large-scale distributed system management. The UE communicates with the AS to obtain an application packet. It should be noted that the AF is a control plane of the AS.

It should be understood that embodiments of this application are not limited to a system architecture shown in FIG. 1. For example, a communication system to which the communication method in this embodiment of this application may be applied may include more or fewer network elements or devices. The devices or the network elements in FIG. 1 may be hardware, or may be software obtained through function division, or a combination thereof. The devices or the network elements in FIG. 1 may communicate with each other via another device or network element.

Before the method in this application is described in detail, some concepts in this application are first briefly described.

In subsequent descriptions, for ease of understanding, an example in which a source transport layer proxy network element is a source PSA (S-PSA), a target transport layer proxy network element is a target PSA (T-PSA), a first application server is a source application server (S-AS), and a second application server is a target AS (T-AS) is used for description in embodiments of this application.

1. Transmission Control Protocol (TCP)

The TCP is a connection-oriented, reliable, and byte stream-based transport layer communication protocol. To ensure reliability of packet transmission, the TCP allocates a sequence number to each packet, where the sequence number also ensures that packets transmitted to a receive end are received in sequence. The receive end returns a corresponding acknowledgement (ACK) for a byte that has been successfully received. If a transmit end does not receive an acknowledgment within an appropriate round-trip time (RTT), corresponding data (assuming that the data is lost) is retransmitted.

An example in which a TCP connection is established between a client and a server is used to describe a process of establishing a TCP connection.

The client and the server establish the TCP connection based on a TCP three-way handshake process:

(1) The client sends a TCP synchronizing sequence number (SYN) message to the server and waits for an acknowledgment from the server.

(2) After receiving the TCP SYN message, the server returns an SYN+ACK message.

(3) After receiving the SYN+ACK message, the client returns another ACK message to acknowledge that the SYN+ACK message has been received.

2. Multipath TCP (MPTCP)

The MPTCP is a multipath TCP protocol used for multipath transmission. A core idea of the MPTCP is to add, between an application layer and a transport layer, a Multipath TCP layer that supports the multipath transmission, so that the multipath transmission is implemented.

Figure 2:
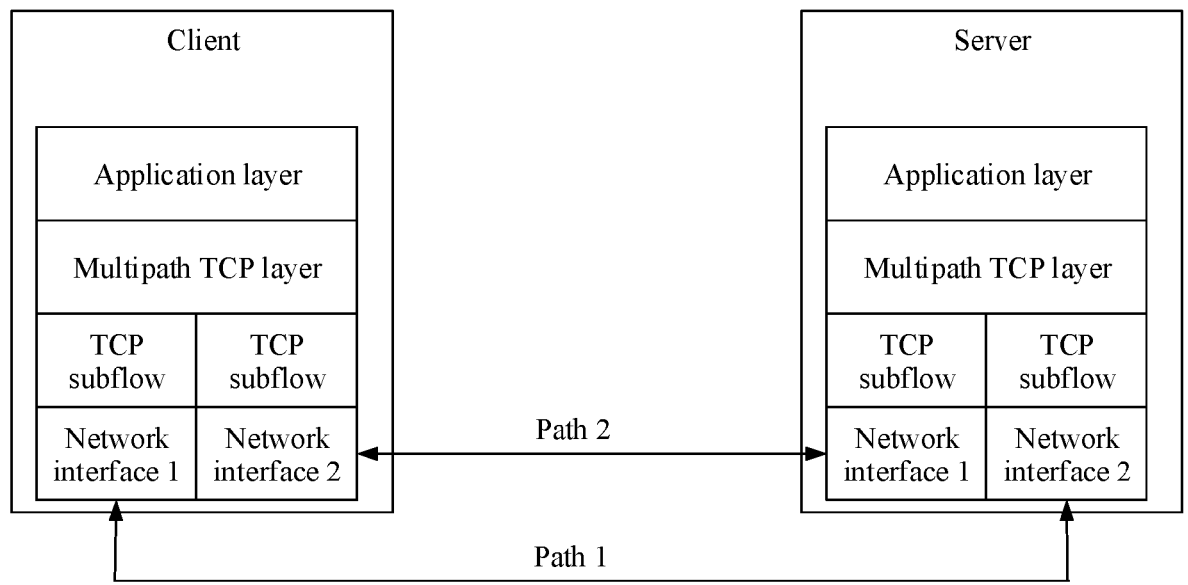
FIG. 2 is a schematic diagram of an architecture of an MPTCP protocol according to an embodiment of this application.

An example in which a client sends data to a server is used. As shown in FIG. 2, data transmitted at an application layer may be divided into a plurality of MPTCP subflows at a Multipath TCP layer of the client, where different MPTCP subflows are sent to the server through different network interfaces, and the server aggregates the different MPTCP subflows at the MPTCP layer and delivers the aggregated MPTCP subflows to the application layer, so that multipath transmission between the client and the server is implemented.

The MPTCP provides the following mechanism: Data that fails to be sent on an MPTCP subflow 1 may be retransmitted on an MPTCP subflow 2, to ensure that the data successfully arrives. Data queue mapping in the MPTCP allows a transmit end to retransmit data on different subflows by using a same data sequence number.

The client and the server establish an MPTCP connection based on an MPTCP three-way handshake process:

(1) The client sends a TCP SYN message to the server end, and an MPTCP option field includes an MP_CAPABLE option, where the option includes a session key of the client.

(2) If the server supports the MPTCP, the server returns an SYN+ACK message, and similarly, an MPTCP option field includes an MP_CAPABLE option, where the option carries a Key on the server end. Subsequently, an SYN+ACK message that carries the MP_CAPABLE option is referred to as an MPTCP SYN+ACK message for short, and an SYN+ACK message that does not carry the MP_CAPABLE option is referred to as a TCP SYN+ACK message.

(3) The client returns an ACK message, and an MPTCP option field includes an MP_CAPABLE option, where the option carries the client Key and the Key on the server end. Subsequently, an ACK message that carries the MP_CAPABLE option is referred to as an MPTCP ACK message for short, and an ACK message that does not carry the MP_CAPABLE option is referred to as a TCP ACK message.

The session key Key is used by the client and the server end to separately generate a token (token) used to identify an MPTCP session between the client and the server.

The session key Key is further used by the client and the server end to generate a 32-bit hash shared key, namely, a hash-based message authentication code (HMAC), which is used by the client and the server end as authentication information to perform verification when a new connection is established in the MPTCP session. Therefore, after the three-way handshake, both communication ends obtain MPTCP session data of each other.

3. MPTCP Subflow Establishment

Hosts can obtain IP address information of each other by exchanging information, and establish a new subflow by using an unused address pair. Theoretically, either party that supports communication can first request to establish a new subflow through an existing connection, but it is ideal if an end that requests to establish a connection starts first. The new subflow is established by sending a general TCP SYN/ACK packet. The packet includes a TCP connection join (MP_JOIN) option. A verification code in MP_CAPABLE is used to identify validity of a connection that the subflow joins. An encryption policy is negotiated in a MP_JOIN handshake process.

A specific process of establishing an MPTCP subflow is as follows.

(1) A host A uses a new address to send an SYN packet to a peer host B, where the SYN packet carries an MP_JOIN option, and the MP_JOIN option includes a Token-B, where a function of the Token-B is to notify the host B of an MPTCP connection through which a new subflow is to be established.

(2) The peer host B sends an SYN/ACK packet carrying the MP_JOIN option to the host A, where the MP_JOIN option includes an HMAC-B, and the HMAC-B is authentication information of B.

(3) The host A sends an ACK packet to the peer host, where the ACK packet carries the MP_JOIN option, and the MP_JOIN option includes an HMAC-A, and the HMAC-A is authentication information of A.

4. MPTCP Connection Closure

A subflow can be completely closed only after both a transmit end and a receive end of the subflow mutually acknowledge FINs of each other. To enable a subflow in an MPTCP to independently work and to be backward compatible with a standard TCP, each FIN affects only a subflow that sends a FIN packet, and the FIN can be used to close only a specific subflow.

When an application layer calls a close( ) function on a socket, it indicates that an application program has no more data to be sent. In this case, a FIN packet is generated in the standard TCP to close a connection, and a DATA_FIN in the MPTCP is used to complete a same function. The DATA_FIN not only may represent that no more data is to be sent, but also may prove that all data previously sent is successfully received by the receive end. The DATA_FIN has same semantics and a same behavior as a FIN in the standard TCP, but a scope of the DATA_FIN is at an MPTCP connection level. After the DATA_FIN is sent, the entire MPTCP connection is closed. However, the DATA_FIN is acknowledged by using a DATA_ACK only after all data is successfully received. Once one DATA_FIN is acknowledged, all subflows need to be closed.

5. Address Removal

In a life cycle of an MPTCP connection, if an IP address suddenly becomes unavailable, a host of the IP address should send a REMOVE_ADDR option to a peer end, to notify the peer end that the IP address is unavailable, so that the unavailable IP address is removed from the MPTCP connection. After an IP address is removed, any MPTCP subflow associated with the IP address is closed.

6. Address Addition

A purpose of the address addition is to notify a peer end of an available IP-[port]. For example, a Host A may obtain an IP-B1 address of a Host B through a DNS process, but does not know an IP-B2 of another interface of the Host B. In this case, after an MPTCP subflow is established between the Host A and the IP-B1, the Host B may notify the Host A of the another IP address IP-B2 (an ADD_ADDR), so that a new MPTCP subflow is established between the Host A and the IP-B2.

It should be noted that after the Host B notifies the Host A of the IP-B2, it does not mean that the Host A immediately initiates an MPTCP subflow establishment process to the IP-B2.

Generally, a global IP is added by using the ADD_ADDR. Otherwise, an IP address in the subflow establishment process may be unreachable. A peer end IP address used by an initiator of new MPTCP subflow establishment may be obtained from an ADD_ADDR message or in another manner.

7. Transport Layer Proxy Function

The transport layer proxy function is a function of performing transport layer processing on a packet by a transport layer proxy network element (a target transport layer proxy network element or a source transport layer proxy network element in embodiments of this application). The transport layer proxy network element may be a user plane network element. The transport layer proxy network element is responsible for exchanging data between an upstream transport layer connection and a downstream transport layer connection, and needs to maintain an association relationship between an upstream transport layer connection state and a downstream transport layer connection state. Specifically, the upstream transport layer connection and the downstream transport layer connection may be based on different transport layer protocols, for example, a TCP and an MPTCP. In this case, the transport layer processing may be performing processing on a packet in a transmission protocol to obtain a packet in another transmission protocol. For example, a TCP packet is encapsulated as an MPTCP packet, or an MPTCP packet is decapsulated into a TCP packet.

8. Transport Layer Proxy Function Migration

In embodiments of this application, that a transport layer proxy function is migrated from a source transport layer proxy network element to a target transport layer proxy network element means: The source transport layer proxy network element stops performing transport layer processing on a packet, and the target transport layer proxy network element starts performing transport layer processing on a packet, where a context in which the target transport layer proxy network element performs transport layer processing on a packet may be determined based on a context in which the source transport layer proxy network element performs transport layer processing on a packet.

In a communication system, when UE moves from coverage of an original base station to coverage of a current base station, air interface handover is triggered, that is, the UE served by a base station is handed over from the original base station to the current base station. Although a location of the UE changes, the UE still accesses an original user plane network element. However, in practice, a user plane network element closest to the UE may have changed, but the UE still performs packet transmission with the original user plane network element. In this case, a transmission path is long, and accordingly, a packet transmission delay increases. To reduce the packet transmission delay, the transmission path needs to be switched from the original user plane network element to a new user plane network element, that is, PSA relocation needs to be performed.

Figure 3A:
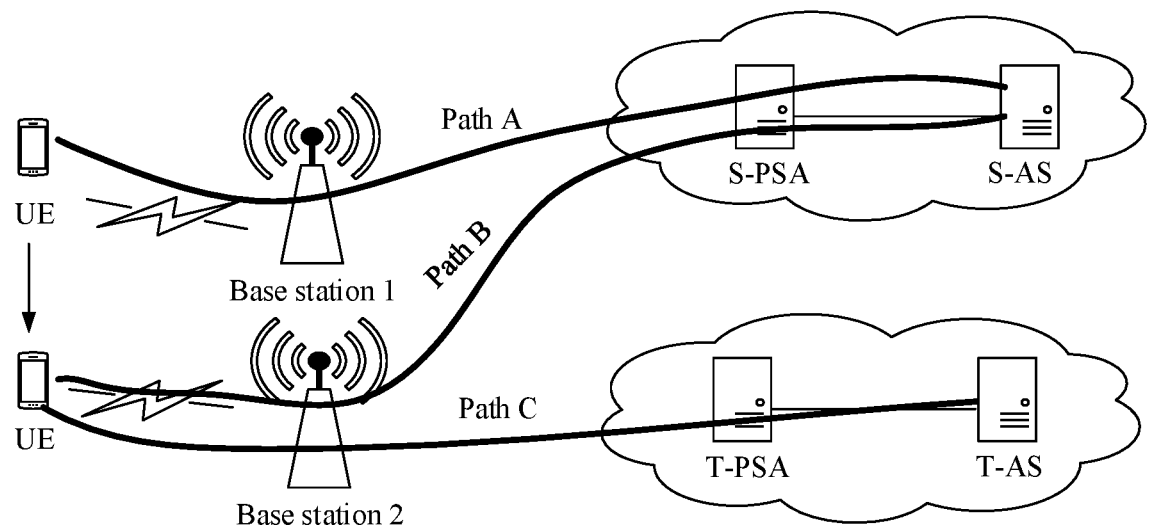
FIG. 3A is a schematic diagram of path switching according to an embodiment of this application.

FIG. 3A is a schematic diagram of a PSA relocation scenario. As shown in FIG. 3A, an S-AS (a first application server) and a T-AS (a second application server) may provide a same application service. When UE moves from coverage of a base station 1 to coverage of a base station 2, air interface handover is first triggered. Before the handover, user plane data is transmitted on a path A, and after the air interface handover, the user plane data is transmitted on a path B. However, in this case, the UE accesses a user plane anchor S-PSA via the base station 2. Consequently, a user plane transmission path detour exists, and a path delay increases. In some low-delay services, for example, in a typical scenario with a 5 ms delay requirement, if an anchor is not relocated from the S-PSA to a T-PSA, in other words, if a user plane transmission path is not switched from the path B to a path C and the path B is still used, in a case in which the UE continues to move, a delay of the path B continues to increase. Consequently, the 5 ms delay requirement cannot be met. Therefore, the user plane transmission path needs to be switched from the path B to the path C. To implement switching from the path B to the path C, transport layer proxy function migration (to be specific, the S-PSA stops performing transport layer processing on a packet, and the T-PSA starts performing transport layer processing on a packet) needs to be performed, and application context migration between the S-AS and the T-AS also needs to be performed. According to a packet transmission method provided in embodiments of this application, seamless cooperation between path switching and application context switching can be implemented, to avoid a packet loss.

The foregoing PSA relocation may be implemented by using an uplink classifier (UL CL).

Figure 3B:
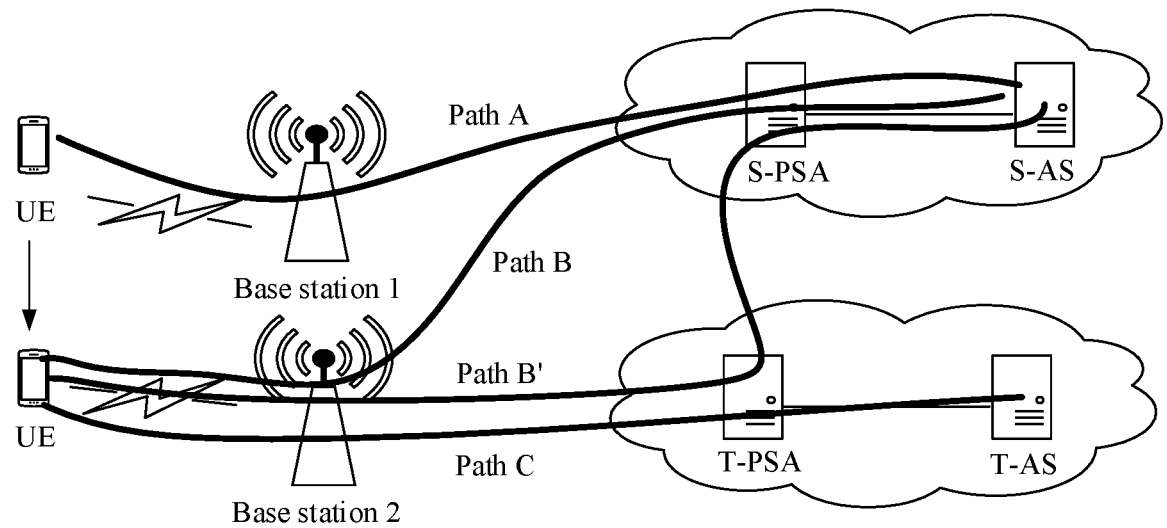
FIG. 3B is another schematic diagram of path switching according to an embodiment of this application.

The UL CL means that an SMF may add a new PSA UPF for an original PDU session, and insert a UL CL on a data transmission path of the original PDU session. A "UL CL" function is provided by a UPF to forward a data packet that meets a service filtering rule to a designated path. When the UPF with the "UL CL" function is inserted into a data channel of a PDU session, the PDU session can provide, by using a plurality of PSAs, a plurality of different paths that access a same DN. The "UL CL" function is to transmit uplink data to different PDU session anchors, combine downlink data, and send the combined data to the UE. A common scenario is that the UPF with the UL CL function and a newly added anchor UPF are integrated, in other words, the newly added PSA UPF also has the UL CL function. As shown in FIG. 3B, after the air interface handover of the UE is completed, the SMF inserts a new anchor UPF T-PSA, and the T-PSA is further used as the UL CL. Subsequently, a user plane data path changes to a path B'.

Figure 4:
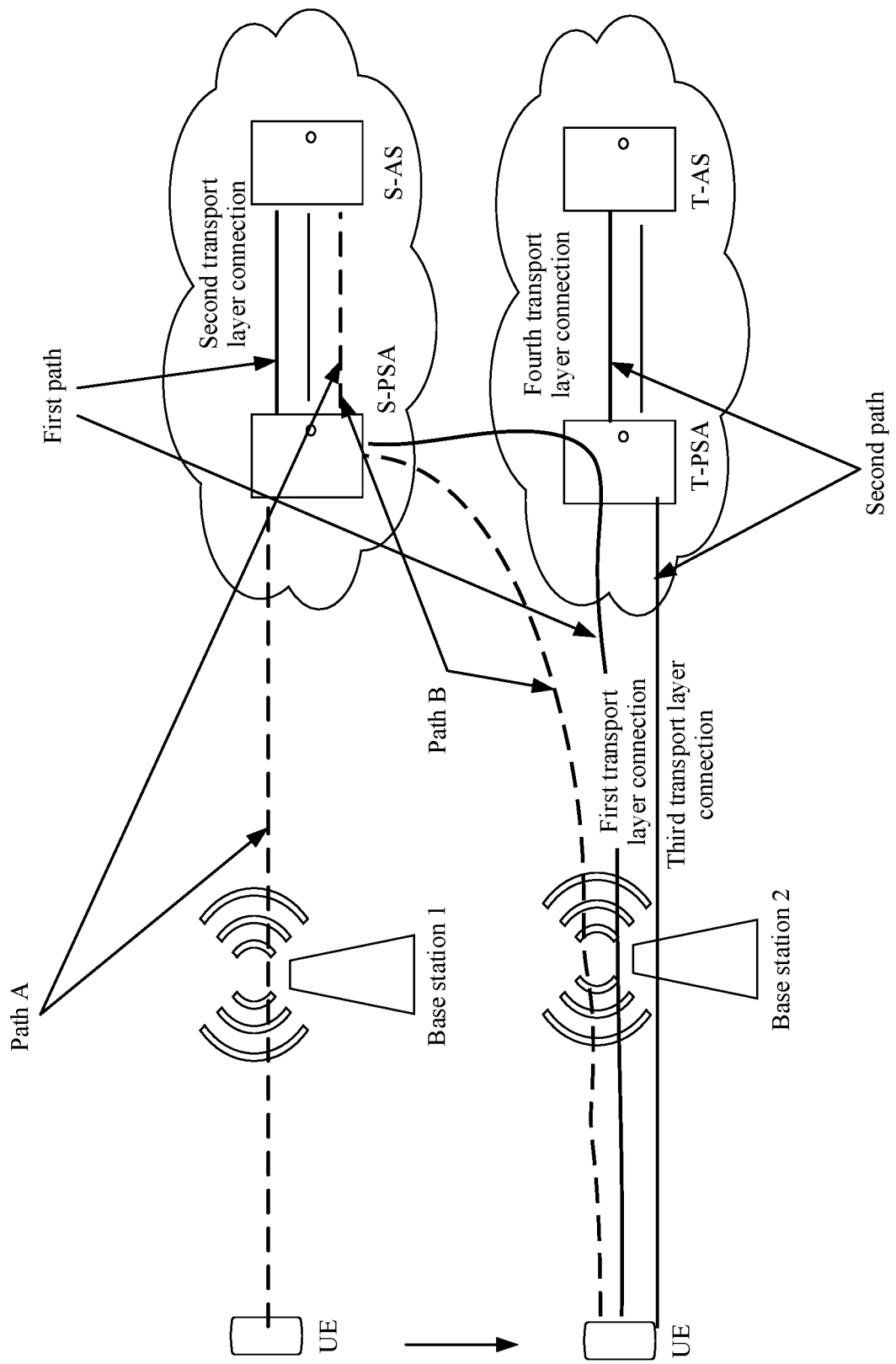
FIG. 4 is another schematic diagram of path switching according to an embodiment of this application.

The following further describes path switching in FIG. 3B with reference to FIG. 4. A first path in FIG. 4 is the path B' in FIG. 3B, and a second path in FIG. 4 is a path C in FIG. 3B.

As shown in FIG. 4, UE establishes a session with an S-PSA via a base station 1. To be specific, a data transmission path of the session is a path A represented by a dashed line in FIG. 4. After the UE moves, air interface handover is performed, and a user plane data transmission path is switched from the path A to a path B in FIG. 4. An SMF detects that the UE moves and a PSA needs to be relocated. A T-PSA is selected as a newly added PSA, and the T-PSA is inserted, as a UL CL, into the user plane transmission path, so that the user plane data transmission path is switched from the path B to the first path in FIG. 4. The S-PSA performs transport layer processing on a packet on the first path. In this case, a user plane transmission path detour exists, and a path delay increases. Further, the first path needs to be switched to the second path. During the path switching, as for a stateful application, an application context of the terminal needs to be migrated from an S-AS to a T-AS. If application context migration and the path switching are not coordinated, a packet loss occurs. For example, in a process of switching a transmission path of a packet from the first path to the second path, a packet that is being transmitted on the first path may be lost due to a path switching operation. In this case, a packet loss rate is high, and transmission performance is poor.

Embodiments of this application provide a packet transmission method, to implement seamless cooperation between path switching and application context migration, to avoid a packet loss. Details are described below.

The following describes the method provided in this application with reference to the concepts described above.

As shown in FIG. 3B, the PSA needs to be relocated when the UE moves. Therefore, the target transport layer proxy network element (the T-PSA) is inserted, as the UL CL, into the user plane transmission path, that is, a transmission path of a packet is the path B' in FIG. 3B. In this case, a path detour exists, and the path B' needs to be switched to the path C. However, to switch from the path B' to the path C, application context migration between the first application server (the S-AS) and the second application server (the T-AS) needs to be performed, so that the packet loss is avoided. Cooperation between the path switching and the application context migration is described below in detail with reference to FIG. 5A and FIG. 5B.

Figure 5A:
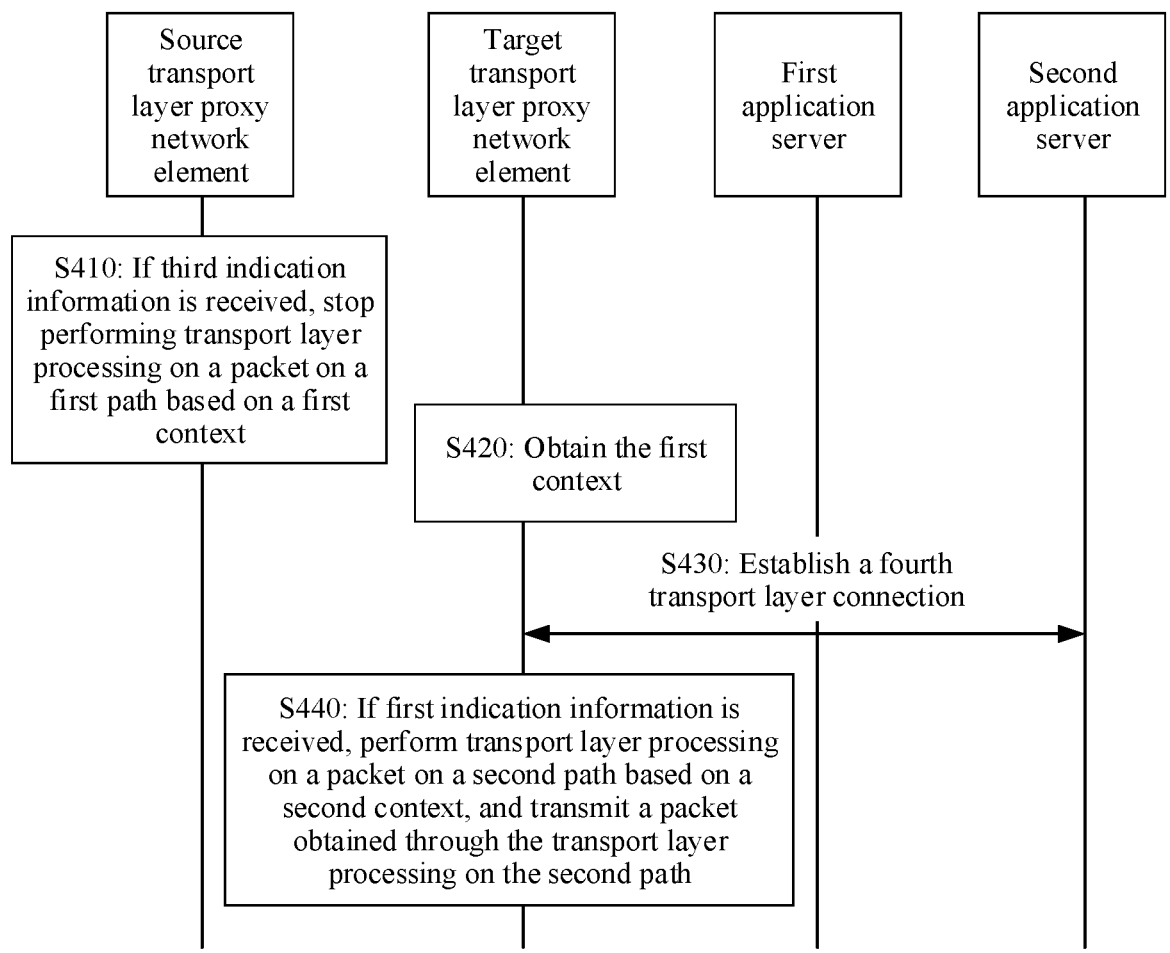
FIG. 5A is a schematic flowchart of a packet transmission method according to an embodiment of this application.

As shown in FIG. 5A, the method may include but is not limited to S410 to S440. The following describes the steps. It should be noted that an execution sequence of the steps is not limited.

S410: A source transport layer proxy network element receives third indication information, and the source transport layer proxy network element stops performing transport layer processing on a packet on a first path based on a first context of the source transport layer proxy network element, where the first context is a context about packet transmission of the source transport layer proxy network element on the first path.

As shown in FIG. 4, the first path is a path established between a terminal device (UE) and a first application server (an S-AS), the first path includes a first transport layer connection and a second transport layer connection, the first transport layer connection is a transport layer connection between the source transport layer proxy network element (an S-PSA) and the terminal device, and the second transport layer connection is a transport layer connection between the source transport layer proxy network element (the S-PSA) and the first application server (the S-AS).

An SMF detects that the terminal device moves and a PSA needs to be relocated, and therefore inserts a target transport layer proxy network element as a UL CL into a user plane transmission path. The target transport layer proxy network element forwards only the packet on the first path, but does not perform transport layer processing on the packet on the first path. That is, in this case, a transport layer proxy function of the target transport layer proxy network element is not activated yet. The source transport layer proxy network element performs transport layer processing on the packet on the first path based on the first context, to be specific, the source transport layer proxy network element receives, from the target transport layer proxy network element, an uplink packet sent by the terminal device, performs transport layer processing on the uplink packet based on the first context, and then sends an uplink packet obtained through the transport layer processing to the first application server; or the source transport layer proxy network element receives, from the first application server, a downlink packet sent to the terminal device, performs transport layer processing on the downlink packet based on the first context, and then sends a downlink packet obtained through the transport layer processing to the terminal device via the target transport layer proxy network element.

The first context includes a first transport layer connection parameter and a second transport layer connection parameter. The first transport layer connection parameter and the second transport layer connection parameter are used for the source transport layer proxy network element to perform transport layer processing on the packet on the first path. Alternatively, the first context includes a first transport layer connection parameter, a first transmission state parameter, a second transport layer connection parameter, and a second transmission state. The first transport layer connection parameter and the second transport layer connection parameter are used to perform transport layer processing, the first transmission state parameter is used to indicate a packet transmission state of the first transport layer connection, and the second transmission state parameter is used to indicate a packet transmission state of the second transport layer connection. Optionally, for the first transport layer connection parameter and the second transport layer connection parameter, the first transport layer connection parameter and the second transport layer connection parameter include but are not limited to: an IP address and a port number that are of the UE, a local IP address and a port number that are of the second transport layer connection, an IP address and a port number that are of a server 1, key information and hash encryption algorithm information (where for example, an HMAC-SHA256 encryption algorithm is used) that are of two ends (the S-PSA and the server 1) of the second transport layer connection, and for a specific service data flow (SDF), information unrelated to a time sequence, such as a mapping relationship between a data sequence number (DSN) and a subflow sequence number (SSN), an initial subflow sequence number (ISSN), and a mapping relationship between a TCP sequence number of a first transport layer connection and an SSN. For detailed content of the HMAC-SHA256, the DSN, the SSN, the ISSN, and the like, refer to the conventional technology. Optionally, the first transmission state parameter may be a sequence number of a sent uplink/downlink packet of a TCP connection in FIG. 9 and FIG. 12 and a sequence number of an ACK for the sent uplink/downlink packet of the TCP connection in FIG. 9 and FIG. 12; and the second transmission state parameter may be a sequence number of a sent uplink/downlink packet of an MPTCP connection in FIG. 9 and FIG. 12 and a sequence number of an ACK for the sent uplink/downlink packet of the MPTCP connection in FIG. 9 and FIG. 12. For details, refer to descriptions in subsequent embodiments. The details are not described herein.

Optionally, the first transport layer connection may be the TCP connection, and the second transport layer connection may be the MPTCP connection. In this case, the transport layer processing may include encapsulating an uplink TCP packet into an MPTCP packet and decapsulating a downlink MPTCP packet into a TCP packet.

When the source transport layer proxy network element receives the third indication information, the source transport layer proxy network element stops performing transport layer processing on the packet on the first path based on the first context of the source transport layer proxy network element. Optionally, the source transport layer proxy network element may stop performing transport layer processing after determining that the target transport layer proxy network element has started performing transport layer processing on a packet.

Figure 6:
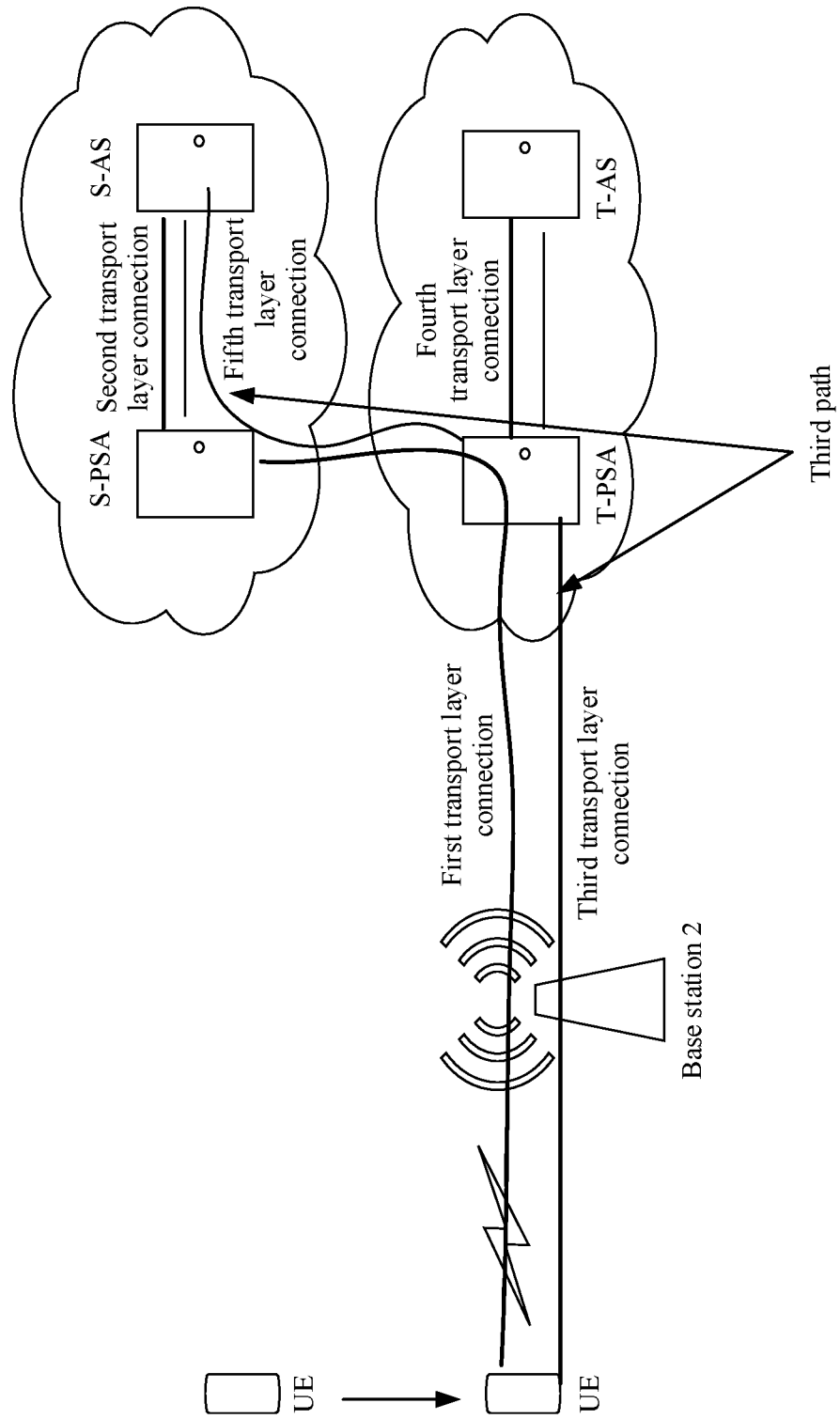
FIG. 6 is still another schematic diagram of path switching according to an embodiment of this application.

In a first embodiment, after the source transport layer proxy network element stops performing transport layer processing on a packet and the target transport layer proxy network element starts performing transport layer processing on a packet, the target transport layer proxy network element may continue to perform transport layer processing on a packet on a third path based on the first context of the source transport layer proxy network element, and transmit a packet obtained through the transport layer processing on the third path. As shown in FIG. 6, the third path is still a packet transmission path between the terminal device and the first application server. However, a difference between the third path and the first path lies in: The target transport layer proxy network element performs transport layer processing on the packet on the third path while the source transport layer proxy network element performs transport layer processing on the packet on the first path. The third path may include a third transport layer connection and a fifth transport layer connection. The third transport layer connection is a transport layer connection between the terminal device and the target transport layer proxy network element, and the fifth transport layer connection is a transport layer connection between the target transport layer proxy network element and the first application server. The fifth transport layer connection passes through the source transport layer proxy network element, to be specific, after performing transport layer processing on the uplink packet sent by the terminal device, the target transport layer proxy network element sends the uplink packet obtained through the transport layer processing to the first application server through the fifth transport layer connection via the source transport layer proxy network element. Alternatively, the target transport layer proxy network element receives, from the source transport layer proxy network element, the downlink packet sent by the first application server through the fifth transport layer connection; performs transport layer processing on the downlink packet; and then sends a downlink packet obtained through the transport layer processing to the terminal device through the third transport layer connection.

Optionally, when the source transport layer proxy network element stops performing transport layer processing, there is a second uplink packet buffered by the source transport layer proxy network element and/or a second downlink packet buffered by the source transport layer proxy network element. The second uplink packet is a packet that is received by the source transport layer proxy network element but that is not sent to the first application server, and/or the second uplink packet is a packet that is sent by the source transport layer proxy network element to the first application server but for which an acknowledgment message returned by the first application server is not received. The second downlink packet is a packet that is received by the source transport layer proxy network element but that is not sent to the terminal device, and/or the second downlink packet is a packet that is sent by the source transport layer proxy network element to the terminal device but for which an acknowledgment message returned by the terminal device is not received. The source transport layer proxy network element sends the second uplink packet and/or the second downlink packet to the target transport layer proxy network element. The target transport layer proxy network element performs transport layer processing on the second uplink packet and/or the second downlink packet based on the first context of the source transport layer proxy network element; sends a second downlink packet obtained through the transport layer processing to the terminal device through the third transport layer connection; and sends a second uplink packet obtained through the transport layer processing to the first application server through the fifth transport layer connection.

Optionally, the third transport layer connection may be the TCP connection, and the fifth transport layer connection may be the MPTCP connection. In this case, that the target transport layer proxy network element performs transport layer processing on an uplink packet and a downlink packet that are sent by the source transport layer proxy network element may include: encapsulating a second uplink TCP packet into a second MPTCP packet, and sending the second MPTCP packet to the first application server through the fifth transport layer connection; and decapsulating a second downlink MPTCP packet into a second TCP packet, and sending the second TCP packet to the terminal device through the third transport layer connection.

When the first application server needs to perform application context migration with a second application server, the first application server stops performing packet transmission with the target transport layer proxy network element. Specifically and optionally, when the target transport layer proxy network element receives second indication information sent by the first application server, the target transport layer proxy network element stops sending data to the first application server, where the second indication information is sent when the first application server is to start performing application context migration with the second application server. In an embodiment, the second indication information may further indicate that the target transport layer proxy network element is to stop sending data to the first application server. Alternatively, in another embodiment, the second indication information indicates, to the target transport layer proxy network element, that the first application server has stopped sending data to the target transport layer proxy network element. Alternatively, in another embodiment, the second indication information may further indicate that the application context migration between the first application server and the second application server is to be started.

The target transport layer proxy network element performs, only after the target transport layer proxy network element receives first indication information used to indicate that the application context migration between the first application server and the second application server is completed, transport layer processing on a packet on a second path based on a second context of the target transport layer proxy network element; and transmits, on the second path, a packet obtained through the transport layer processing. For details, refer to descriptions of step S440. Details are not described herein.

In the first embodiment, the third path is used as a transition path, the target transport layer proxy network element starts, by using the third path, performing transport layer processing on a packet, the source transport layer proxy network element stops performing transport layer processing on a packet, and then the application context migration is performed, to implement seamless cooperation between path switching and the application context migration, so that a packet loss is avoided.

In a second embodiment, the third path mentioned in the first embodiment does not exist in this implementation. The first path is directly switched to a second path. The second path includes a third transport layer connection and a fourth transport layer connection, the third transport layer connection is a transport layer connection between the terminal device and the target transport layer proxy network element, and the fourth transport layer connection is a transport layer connection between the target transport layer proxy network element and a second application server. Specifically and optionally, before application context migration is performed between the first application server and the second application server, the source transport layer proxy network element stops performing packet transmission with the first application server. The application context migration is performed between the first application server and the second application server, the source transport layer proxy network element stops performing transport layer processing on a packet, and the target transport layer proxy network element starts performing transport layer processing on a packet.

When the source transport layer proxy network element stops performing packet transmission with the first application server, there is a first uplink packet buffered by the source transport layer proxy network element and/or a first downlink packet buffered by the source transport layer proxy network element. The first uplink packet is a packet that is received by the source transport layer proxy network element but that is not sent to the first application server, and/or the first uplink packet is a packet that is sent by the source transport layer proxy network element to the first application server but for which an acknowledgment message returned by the first application server is not received. The first downlink packet is a packet that is received by the source transport layer proxy network element but that is not sent to the terminal device, and/or the first downlink packet is a packet that is sent by the source transport layer proxy network element to the terminal device but for which an acknowledgment message returned by the terminal device is not received. The source transport layer proxy network element sends the first uplink packet and/or the first downlink packet to the target transport layer proxy network element. The target transport layer proxy network element performs transport layer processing on the first uplink packet and/or the first downlink packet based on a second context of the target transport layer proxy network element; sends a first downlink packet obtained through the transport layer processing to the terminal device through the third transport layer connection; and sends a first uplink packet obtained through the transport layer processing to the second application server through the fourth transport layer connection.

Optionally, the third transport layer connection may be the TCP connection, and the fourth transport layer connection may be the MPTCP connection. In this case, that the target transport layer proxy network element performs transport layer processing on an uplink packet and a downlink packet that are sent by the source transport layer proxy network element may include: encapsulating a first uplink TCP packet into a first MPTCP packet, and sending the first MPTCP packet to the second application server through the fourth transport layer connection; and decapsulating a first downlink MPTCP packet into a first TCP packet, and sending the first TCP packet to the terminal device through the third transport layer connection.

For a specific process in which the target transport layer proxy network element performs transport layer processing on the packet based on the second context, and transmits, on the second path, a packet obtained through the transport layer processing, refer to descriptions of step S440, and details are not described herein.

In the second embodiment, before the application context migration between the first application server and the second application server is performed, the source transport layer proxy network element stops performing packet transmission with the first application server, and the packet obtained through the transport layer processing is transmitted on the second path, to implement seamless cooperation between the application context migration and path switching, so that a packet loss is avoided.

S420: The target transport layer proxy network element obtains the first context.

Optionally, the target transport layer proxy network element may obtain the first context of the source transport layer proxy network element via a session management network element, to be specific, the source transport layer proxy network element sends the first context to the session management network element, and then the session management network element sends the first context to the target transport layer proxy network element. Alternatively, the first context is synchronized between the target transport layer proxy network element and the source transport layer proxy network element, so that the target transport layer proxy network element obtains the first context about the packet transmission of the source transport layer proxy network element on the first path. Specifically, after the first path is established, the source transport layer proxy network element may directly send the first context to the target transport layer proxy network element. For example, after the session management network element detects that the UE moves and the PSA needs to be relocated, the session management network element establishes a user plane tunnel between the source transport layer proxy network element and the target transport layer proxy network element. The source transport layer proxy network element transmits the first context to the target transport layer proxy network element through the user plane tunnel.

Optionally, the first context includes the first transport layer connection parameter and the second transport layer connection parameter. The first transport layer connection parameter and the second transport layer connection parameter are used to perform transport layer processing.

Alternatively, the first context includes the first transport layer connection parameter, the first transmission state parameter, the second transport layer connection parameter, and the second transmission state parameter. The first transport layer connection parameter and the second transport layer connection parameter are used to perform transport layer processing, the first transmission state parameter is used to indicate the packet transmission state of the first transport layer connection, and the second transmission state parameter is used to indicate the packet transmission state of the second transport layer connection.

S430: The target transport layer proxy network element establishes the fourth transport layer connection based on the first context of the source transport layer proxy network element, where the first context is the context about the packet transmission of the source transport layer proxy network element on the first path.

In an embodiment, the second transport layer connection parameter in the first context may be further used to establish the fourth transport layer connection between the target transport layer proxy network element and the second application server. Both the second transport layer connection and the fourth transport layer connection are the MPTCP connections. The second transport layer connection and the fourth transport layer connection may belong to a same MPTCP session. For example, the second transport layer connection and the fourth transport layer connection may be different MPTCP subflows of the same MPTCP session. Because the second transport layer connection and the fourth transport layer connection are the different MPTCP subflows of the same MPTCP session, according to an existing MPTCP mechanism, an endpoint of the MPTCP session may combine and sort packets on the different subflows, so that a packet disorder problem can be avoided.

The target transport layer proxy network element may establish the fourth transport layer connection based on all or a part of the following information. The following information includes: a local (namely, a transport layer proxy network element) IP address and a port number that are of the MPTCP connection, the IP address (an IP 1) and the port number that are of the server 1, key information and hash encryption algorithm information (where for example, the HMAC-SHA256 encryption algorithm is used) that are of two ends of the MPTCP connection, and for the specific SDF, the information unrelated to the time sequence, such as the ISSN and the mapping relationship between a DSN and an SSN. For the detailed content of the HMAC-SHA256, the DSN, the SSN, the ISSN, and the like, refer to the conventional technology.

It should be noted that, before the fourth transport layer connection is established between the target transport layer proxy network element and the second application server, context synchronization of the MPTCP connection needs to be performed between the second application server and the first application server. A context of the MPTCP connection may include key information on a target transport layer proxy network element side and a first application server side, a hash encryption algorithm, and the like. The context of the MPTCP connection is used to establish the fourth transport layer connection between the second application server and the target transport layer proxy network element.

Further, optionally, before establishing the fourth transport layer connection to the second application server, the target transport layer proxy network element further needs to obtain an address of the second application server, to establish the fourth transport layer connection to the second application server. The target transport layer proxy network element may obtain the address of the second application server from the session management network element, or may obtain the address of the second application server from the first application server by address addition, for example, obtain the address from the first application server by using a TCP ADD_ADDR message.

S440: If the target transport layer proxy network element receives the first indication information, and the first indication information is used to indicate that the application context migration between the first application server and the second application server is completed, the target transport layer proxy network element performs transport layer processing on the packet on the second path based on the second context of the target transport layer proxy network element, and transmits, on the second path, a packet obtained through the transport layer processing, where the second context is determined based on the first context and a context of the fourth transport layer connection; when the application context migration is being performed, packet transmission between the first application server and a transport layer proxy network element is stopped; and the transport layer proxy network element includes the source transport layer proxy network element or the target transport layer proxy network element.

In an embodiment, when receiving the first indication information, the target transport layer proxy network element may perform transport layer processing on the packet on the second path based on the second context. Optionally, before performing transport layer processing on the packet on the second path based on the second context, the target transport layer proxy network element receives, from the source transport layer proxy network element, an uplink packet and a downlink packet that are buffered by the source transport layer proxy network element; further performs transport layer processing on the uplink packet and the downlink packet based on the second context; and transmits, on the second path, an uplink packet and a downlink packet that are obtained through the transport layer processing. For details, refer to the descriptions in the foregoing second embodiment. The details are not described herein again.

The second context is determined based on the first context and the context of the fourth transport layer connection. The context of the fourth transport layer connection includes but is not limited to an IP address and a port number that are of the second application server, a mapping relationship between a TCP sequence number of a fourth transport layer connection and an SSN, the mapping relationship between a DSN and an SSN, and the like.

It may be understood that, in the foregoing descriptions, the session management network element indicates the source transport layer proxy network element to stop performing transport layer processing on a packet, and the session management network element indicates the target transport layer proxy network element to start performing transport layer processing on a packet.

Based on the packet transmission method in FIG. 5A, the session management network element may indicate the source transport layer proxy network element to stop performing transport layer processing on a packet, and the session management network element may indicate the target transport layer proxy network element to start performing transport layer processing on a packet. For details, refer to descriptions of an embodiment in FIG. 5B.

Figure 5B:
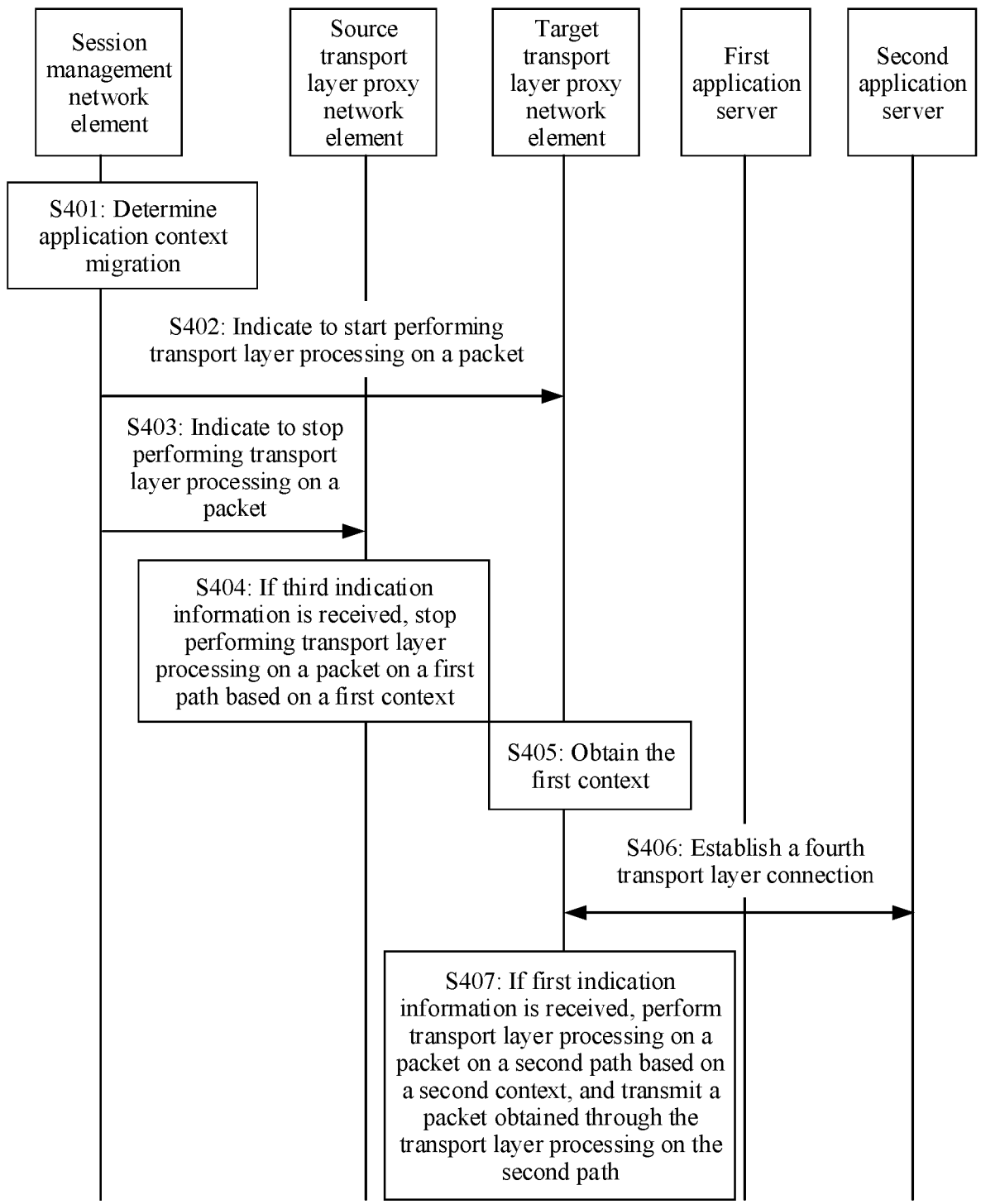
FIG. 5B is a schematic flowchart of another packet transmission method according to an embodiment of this application.

FIG. 5B is a schematic diagram of another optional packet transmission method according to an embodiment of this application. As shown in the figure, the method includes but is not limited to the following steps.

S401: A session management network element determines that application context migration between a first application server and a second application server needs to be performed.

The session management network element may determine, by detecting movement of a terminal, that the application context migration between the first application server and the second application server needs to be performed. Specifically, the SMF first detects that the terminal device moves and an anchor user plane network element needs to be changed. Specifically, the SMF may determine, based on location information of the terminal device after air interface handover, that the anchor user plane network element needs to be changed for the terminal device. Then, the SMF sends a user plane anchor change notification or a data network access identifier (data network access identifier, DNAI) change notification message to an AF, where the notification message carries a target DNAI, and optionally, further carries an identifier of the terminal. After receiving the user plane anchor change notification or the DNAI change notification sent by the SMF, the AF indicates the SMF to perform context migration between application servers.

S402: The session management network element indicates a target transport layer proxy network element to start performing transport layer processing on a packet.

In an embodiment, the session management network element may send a notification message to the target transport layer proxy network element, where the notification message is used to indicate that the target transport layer proxy network element is to start performing transport layer processing on a packet. Optionally, the notification message may further include a first context about packet transmission of a source transport layer proxy network element on a first path, so that the target transport layer proxy network element may establish a fourth transport layer connection based on the first context, and generate a second context based on the first context and the fourth transport layer connection. Alternatively, the target transport layer proxy network element may perform transport layer processing on a packet on a third path based on the first context. For details, refer to the descriptions of the embodiment in FIG. 5A, and the details are not described herein again.

S403: The session management network element indicates the source transport layer proxy network element to stop performing transport layer processing on a packet.

In an embodiment, the session management network element may send a deactivation instruction to the source transport layer proxy network element, where the deactivation instruction is used to indicate that the source transport layer proxy network element is to stop performing transport layer processing on a packet. Third indication information in S404 in this embodiment of this application may be the deactivation instruction.

S404: If the source transport layer proxy network element receives the third indication information, the source transport layer proxy network element stops performing transport layer processing on the packet on the first path based on the first context of the source transport layer proxy network element, where the first context is a context about the packet transmission of the source transport layer proxy network element on the first path.

S405: The target transport layer proxy network element obtains the first context.

S406: The target transport layer proxy network element establishes the fourth transport layer connection based on the first context of the source transport layer proxy network element, where the first context is the context about the packet transmission of the source transport layer proxy network element on the first path.

S407: If the target transport layer proxy network element receives first indication information, and the first indication information is used to indicate that the application context migration between the first application server and the second application server is completed, the target transport layer proxy network element performs transport layer processing on a packet on a second path based on the second context of the target transport layer proxy network element, and transmits, on the second path, a packet obtained through the transport layer processing, where the second context is determined based on the first context and a context of the fourth transport layer connection; when the application context migration is being performed, packet transmission between the first application server and a transport layer proxy network element is stopped; and the transport layer proxy network element includes the source transport layer proxy network element or the target transport layer proxy network element.

For step S404 to step S407, refer to the descriptions in the embodiment in FIG. 5A. Details are not described herein again.

With reference to FIG. 7A and FIG. 7B to FIG. 18, the methods shown in FIG. 5A and FIG. 5B are described in more detail. For ease of understanding, in FIG. 7A and FIG. 7B to FIG. 18, an example in which a session management network element is an SMF, a source transport layer proxy network element is a source PSA (Source PSA, S-PSA), a target transport layer proxy network element is a target PSA (target PSA, T-PSA), a first application server is a server 1, and a second application server is a server 2 is used for description. In subsequent embodiments, that "the T-PSA starts performing transport layer processing on a packet" is referred to as starting a transport layer proxy function; that "the S-PSA stops performing transport layer processing on a packet" is referred to as stopping performing the transport layer proxy function; and that the T-PSA starts the transport layer proxy function and the S-PSA stops performing the transport layer proxy function is referred to as transport layer proxy function migration.

A specific SDF mentioned in subsequent embodiments refers to a packet that meets a service filtering rule.

A TCP/IP connection between UE and a server is divided into two parts: a common TCP connection between the UE and a PSA and an MPTCP connection between the PSA and the server, for example, an established MPTCP subflow. Specifically and optionally, there is a TCP connection between the UE and the S-PSA, there is an MPTCP connection (for example, an MPTCP subflow 1) between the S-PSA and the server 1, there is a TCP connection between the UE and the T-PSA, there is an MPTCP connection (for example, the MPTCP subflow 1) between the T-PSA and the server 1, and there is an MPTCP connection (for example, an MPTCP subflow 2) between the T-PSA and the server 2.

For ease of understanding, the foregoing establishment of the TCP connection and the MPTCP connection is first described below with reference to FIG. 13 to FIG. 18. That the UE establishes the TCP connection to the S-PSA and the S-PSA establishes the MPTCP connection to the server 1 is used as an example for description, and two embodiments are included.

Figure 13:
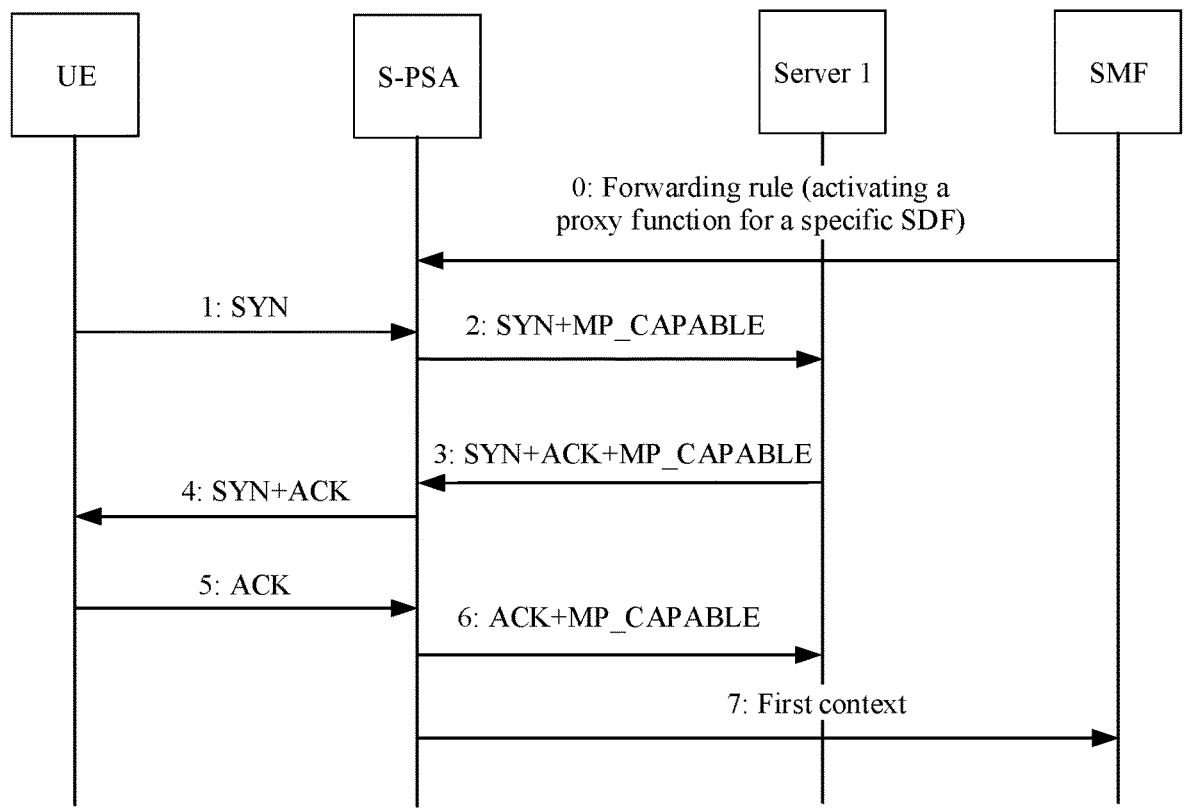
FIG. 13 is a schematic diagram of establishing a connection according to an embodiment of this application.

In a first embodiment, as shown in FIG. 13, a manner of establishing the TCP connection and the MPTCP connection includes but is not limited to step 0 to step 7:

Step 0: The SMF delivers, to the S-PSA, a forwarding rule including an indication that the S-PSA is to start the transport layer proxy function for the specific SDF.

Step 1: When the UE needs to perform service data transmission, the UE initiates the TCP connection to the server 1, where a source address carried in a payload of a TCP SYN packet is an address of the UE, namely, an IP A, and a target address is an IP address of the server 1, namely, an IP 1.

Step 2: The S-PSA receives the TCP SYN sent by the UE; determines, based on the indication from the SMF, to start the transport layer proxy function; and sends a TCP SYN message to the server 1, where the TCP SYN packet carries an MP_CAPABLE option, the MP_CAPABLE option is used to establish the MPTCP connection to the server 1, a source address carried in a payload of the TCP SYN packet is an address of the S-PSA, namely, an IP 3, and a target address is the IP address of the server 1, namely, the IP 1.

Step 3: The server 1 returns an SYN+ACK packet to the S-PSA, where the SYN+ACK packet carries an MP_CAPABLE option that indicates that the server 1 supports an MPTCP.

Step 4: After receiving the SYN+ACK packet from the server 1, the S-PSA returns an SYN+ACK packet to the UE, where the SYN+ACK packet does not carry an MP_CAPABLE option.

Step 5: The S-PSA receives an ACK packet returned by the UE.

Step 6: After receiving the ACK packet returned by the UE, the S-PSA returns an ACK packet to the server 1, where the ACK packet carries an MP_CAPABLE option.

Step 7: The S-PSA sends a first context of the S-PSA to the SMF, where the first context includes: the IP address and a port number that are of the UE, a local IP address and a port number that are of the MPTCP connection, the IP address and a port number that are of the server 1, information unrelated to a time sequence, such as key information/an encryption algorithm (for example, an HMAC-SHA256) of two ends of the MPTCP connection; for the specific SDF, a mapping relationship between a TCP sequence number and an SSN and a mapping relationship between a DSN and an SSN.

It can be learned from the foregoing that steps 1, 4, and 5 comply with a TCP three-way handshake process, and a format of a TCP message in the steps is also the same as that of an existing corresponding TCP message; and steps 2, 3, and 6 comply with an MPTCP three-way handshake process, and a format of an MPTCP message in the steps is also the same as that of an existing corresponding MPTCP message. In addition, the S-PSA does not generate the TCP message or the MPTCP message, but only forwards a received TCP message or an MPTCP message after modifying a format of the received TCP message or the received MPTCP message. For example, in an uplink direction, after receiving a TCP message sent by the UE, the S-PSA encapsulates the TCP message into an MPTCP message and forwards the MPTCP message to the server 1; and in a downlink direction, after receiving an MPTCP message sent by the server 1, the S-PSA encapsulates the MPTCP message into a TCP message and forwards the TCP message to the UE. In addition, the S-PSA sends the first context of the S-PSA to the SMF after a connection is established, so that when the T-PSA subsequently starts the transport layer proxy function, the SMF directly sends the first context of the S-PSA to the T-PSA, where the first context includes a connection parameter of the TCP connection and a connection parameter of the MPTCP connection.

It should be noted that step 7 is an optional step. In an embodiment, the S-PSA sends the first context to the SMF, so that the SMF sends the first context to the T-PSA.

In another embodiment, after a first path is established, forwarding by the SMF is not required, and the S-PSA may directly send the first context to the T-PSA. For example, after the session management network element detects that the UE moves and the PSA needs to be relocated, the SMF establishes a user plane tunnel between the S-PSA and the T-PSA, and the S-PSA transmits the first context to the T-PSA through the user plane tunnel.

Figure 14:
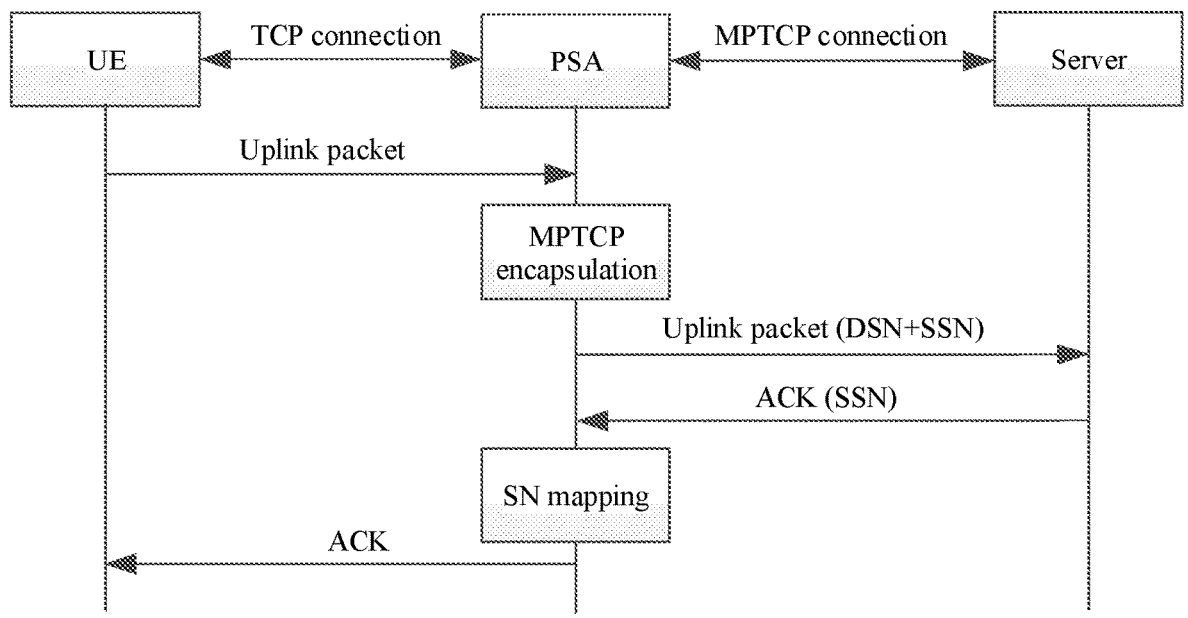
FIG. 14 is a schematic diagram of uplink packet transmission according to an embodiment of this application.
Figure 15:
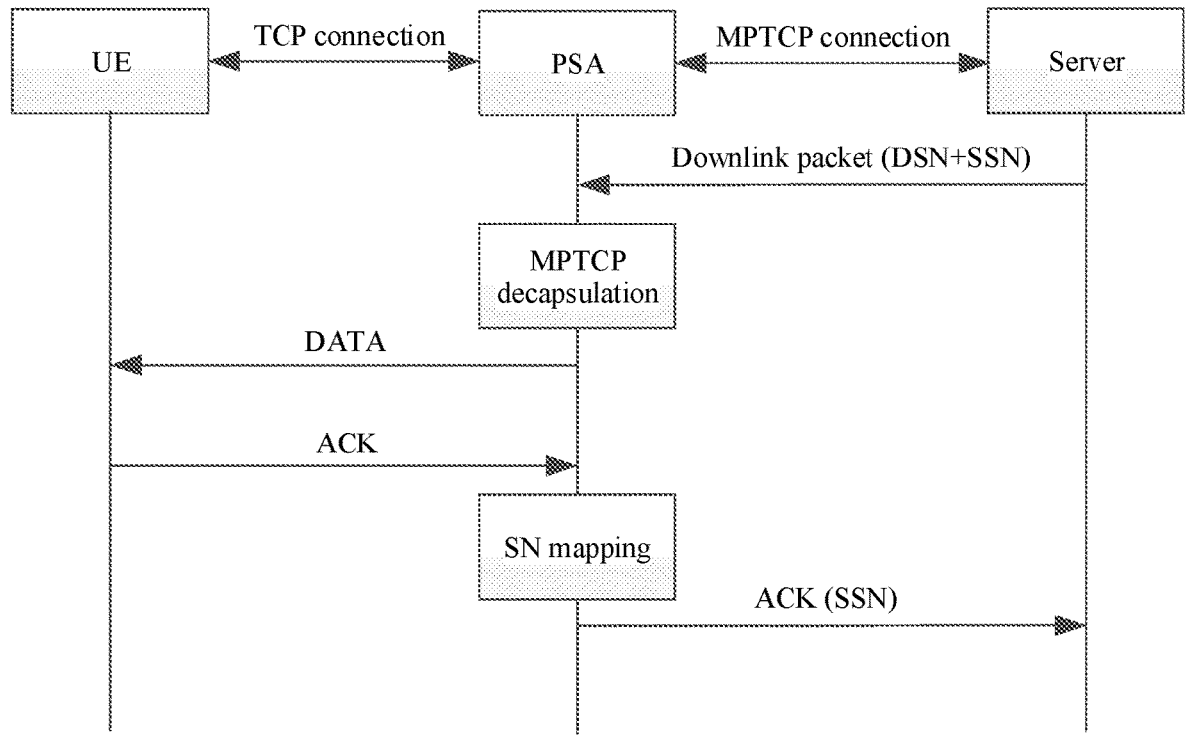
FIG. 15 is a schematic diagram of downlink packet transmission according to an embodiment of this application.

Based on the manner of establishing the TCP connection and the MPTCP connection in FIG. 13, the following describes a transmission manner of an uplink packet and a downlink packet with reference to FIG. 14 and FIG. 15.

Refer to FIG. 14 for the uplink packet. An uplink packet sent by UE carries a TCP sequence number. After receiving the uplink packet, a PSA performs MPTCP encapsulation at a transport layer, and generates a subflow sequence number SSN based on the TCP sequence number of the packet. After the MPTCP encapsulation of the packet is completed, the PSA sends an MPTCP packet to a server. After receiving an ACK that is sent by the server and that is for the MPTCP packet, the PSA returns a TCP ACK to the UE based on a correspondence between a TCP sequence number and an SSN, where the TCP ACK carries the TCP sequence number.

Refer to FIG. 15 for the downlink packet. An MPTCP packet sent by the server carries an SSN. After receiving the MPTCP packet, the PSA generates a TCP sequence number based on the subflow sequence number SSN; decapsulates the MPTCP packet; generates a TCP packet based on the TCP sequence number; and sends the TCP packet to the UE. After receiving a TCP ACK from the UE, the PSA completes, based on a mapping relationship between an SSN and a TCP SN, mapping between the TCP SN and the SSN, and returns an MPTCP ACK carrying the SSN to the server.

It can be learned from the foregoing that, after receiving the uplink packet sent by the UE, the PSA does not directly return the TCP ACK to the UE. Instead, after receiving the MPTCP ACK sent by the server, the PSA modifies a format of the MPTCP ACK into the TCP ACK and forwards the TCP ACK to the UE. If the UE does not receive the TCP ACK, the UE retransmits the uplink packet. After receiving the downlink packet sent by the server, the PSA does not directly return the MPTCP ACK to the server either. Instead, after receiving the TCP ACK sent by the UE, the PSA modifies a format of the TCP ACK into the MPTCP ACK and forwards the MPTCP ACK to the server. If the server does not receive the MPTCP ACK, the server retransmits the downlink packet.

Figure 16:
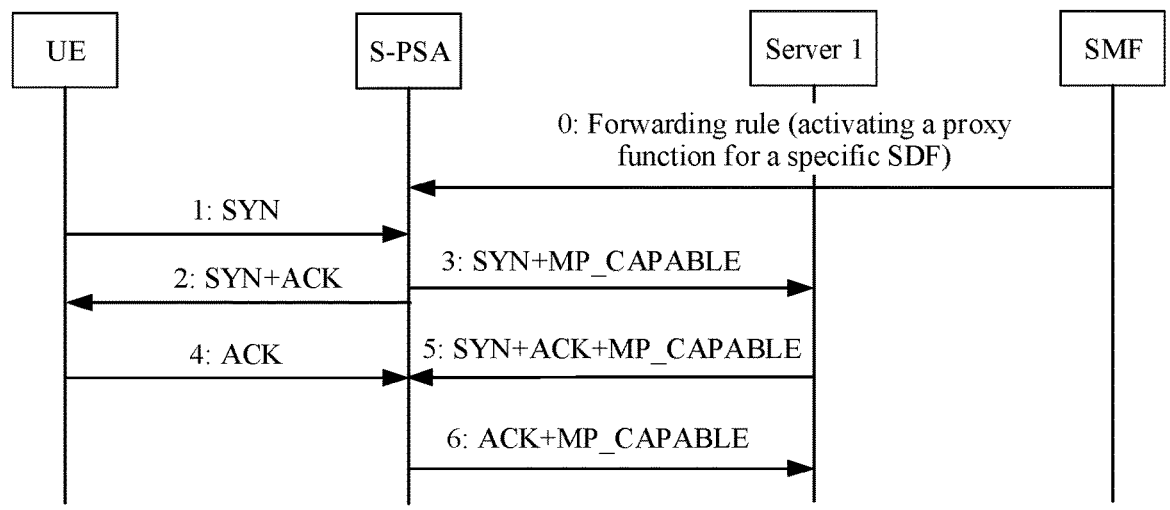
FIG. 16 is a schematic diagram of establishing a connection according to an embodiment of this application.

In a second embodiment, as shown in FIG. 16, a manner of establishing the TCP connection and the MPTCP connection includes but is not limited to step 0 to step 6:

Step 0: The SMF delivers, to the S-PSA, a forwarding rule including an indication that the S-PSA is to start the transport layer proxy function for the specific SDF.

Step 1: When the UE needs to transmit service data, the UE initiates the TCP connection to the server 1, where a source address carried in a payload of an SYN packet is an address of the UE, namely, an IP A, and a target address is an IP address of a source server server 1, namely, an IP 1.

Step 2: The S-PSA receives a TCP SYN sent by the UE; generates a TCP SYN+ACK; and returns the TCP SYN+ACK to the UE.

Step 3: The S-PSA determines, based on the indication from the SMF, to start the transport layer proxy function; the S-PSA sends a TCP SYN message to the server 1, where the TCP SYN packet carries an MP_CAPABLE option; and the S-PSA establishes the MPTCP connection to the server 1, where a source address carried in a payload of the TCP SYN packet is an address of the S-PSA, namely, an IP 3, and a target address is the IP address of the server 1, namely, the IP 1.

Step 4: The S-PSA receives a TCP ACK sent by the UE.

Step 5: The server 1 sends an SYN+ACK packet to the S-PSA, where the SYN+ACK packet carries an MP_CAPABLE option.

Step 6: The S-PSA returns an ACK packet to the server 1, where the ACK packet carries an MP_CAPABLE option.

It can be learned from the foregoing that steps 1, 4, and 5 comply with a TCP three-way handshake process, and a format of a TCP message in the steps is also the same as that of an existing corresponding TCP message; and steps 2, 3, and 6 comply with an MPTCP three-way handshake process, and a format of an MPTCP message in the steps is also the same as that of an existing corresponding MPTCP message. Steps 1, 2, and 4 are performed in sequence, steps 3, 5, and 6 are performed in sequence, step 3 is performed after step 1, and an execution sequence of step 5 and step 6 is irrelevant to that of step 2 and step 4. In FIG. 16, the S-PSA generates the SYN packet and the ACK packet, and sends the SYN packet and the ACK packet to the UE or the server 1 without waiting to receive and forward an SYN packet and an ACK packet that are sent by another network element (the UE or the server 1). To be specific, the S-PSA performs step 2 to send the TCP SYN+ACK message to the UE without waiting to receive an MPTCP SYN+ACK message sent by server 1 in step 5, and the S-PSA performs step 6 to send the MPTCP ACK message to the server 1 without waiting to receive the TCP ACK message sent by the UE in step 4. In addition, in FIG. 16, after a connection is established, the S-PSA does not send a first context of the S-PSA to the SMF, and the S-PSA sends the first context to the SMF only when a TCP transport layer proxy function migration is subsequently performed. This is because in this implementation, the first context includes a real-time transmission state of a packet. For details, refer to descriptions in subsequent embodiments. The details are not described herein.

Figure 17:
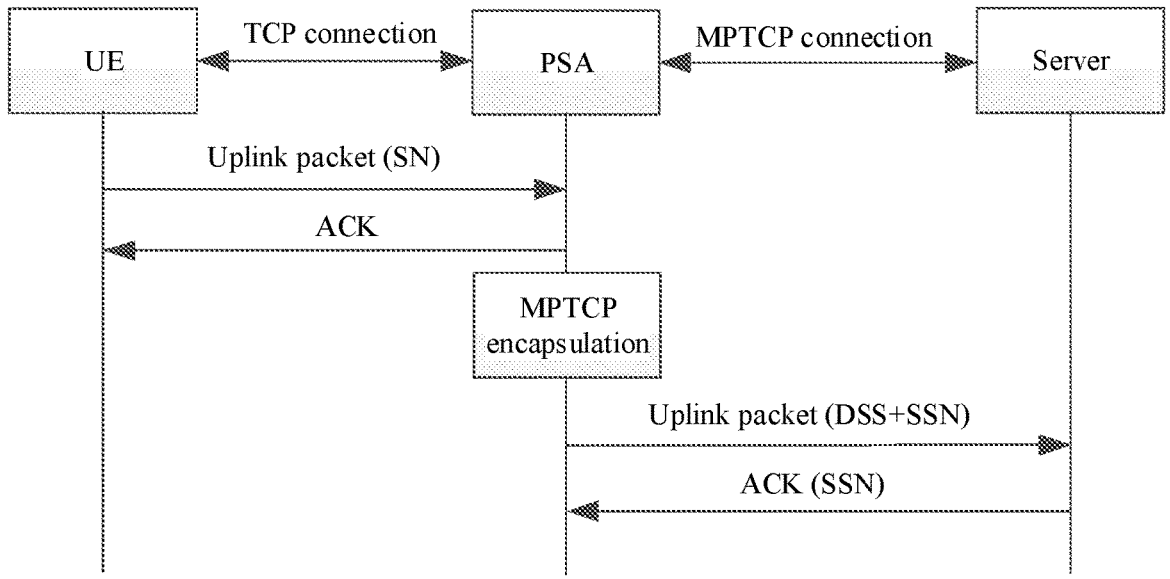
FIG. 17 is a schematic diagram of uplink packet transmission according to an embodiment of this application.
Figure 18:
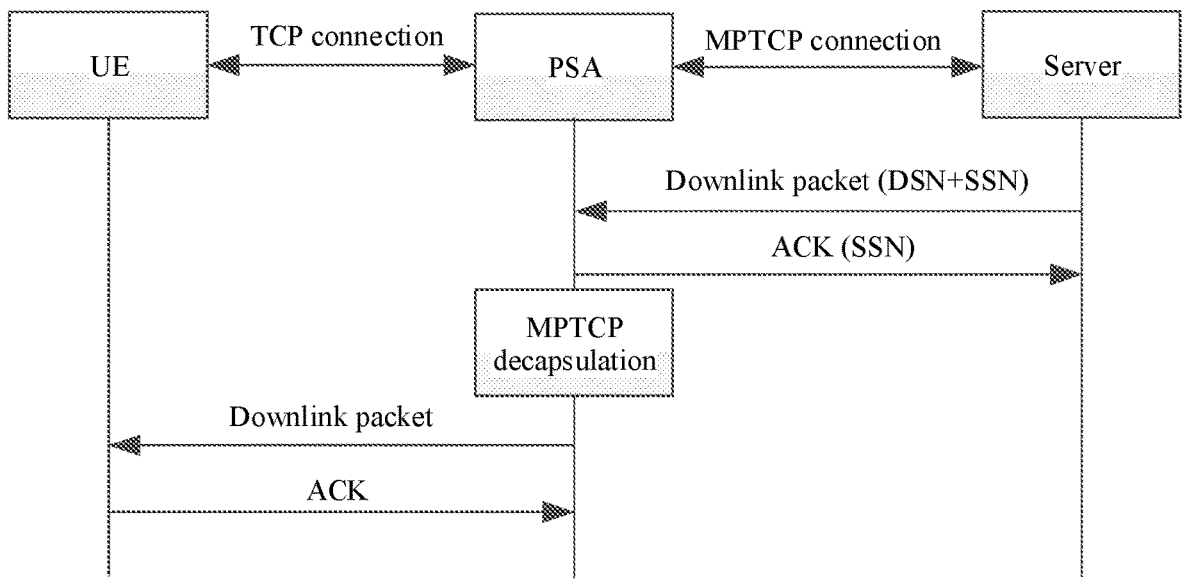
FIG. 18 is a schematic diagram of downlink packet transmission according to an embodiment of this application.

Based on the manner of establishing the TCP connection and the MPTCP connection in FIG. 16, the following describes a transmission manner of an uplink packet and a downlink packet with reference to FIG. 17 and FIG. 18.

Refer to FIG. 17 for the uplink packet. A packet sent by UE carries a TCP sequence number. After receiving the packet, a PSA returns an ACK to the UE; performs MPTCP encapsulation on the packet at a transport layer; and generates a subflow sequence number SSN based on the TCP sequence number of the packet. After the MPTCP encapsulation of the packet is completed, the PSA sends an MPTCP packet to a server, and receives an ACK returned by the server.

Refer to FIG. 18 for the downlink packet. An MPTCP packet sent by the server carries an SSN. After receiving the MPTCP packet, the PSA returns an ACK to the server; performs MPTCP decapsulation on the received packet; generates a TCP sequence number based on the SSN; generates a TCP packet based on the TCP sequence number; sends the TCP packet to the UE; and receives an ACK packet sent by the UE.

It can be learned from the foregoing that, after receiving the uplink packet sent by the UE, the PSA generates the ACK; returns the ACK to the UE; performs MPTCP encapsulation on the uplink packet; sends the uplink packet to the server; and returns a TCP ACK to the UE without waiting for the server to return the ACK for the uplink packet. In this manner, the PSA needs to buffer the received uplink packet sent by the UE, and deletes the uplink packet from a buffer only after receiving the ACK for the uplink packet from the server, to avoid packet retransmission. If the packet retransmission is required, that is, if the PSA does not receive the ACK returned by the server, the PSA may directly retransmit the packet buffered by the PSA. Similarly, as for the downlink packet, the PSA returns the ACK to the server without waiting for the UE to return the ACK. The PSA also needs to buffer the received downlink packet sent by the server. The PSA deletes the downlink packet from the buffer only after receiving the ACK for the downlink packet from the UE.

Figure 7A:
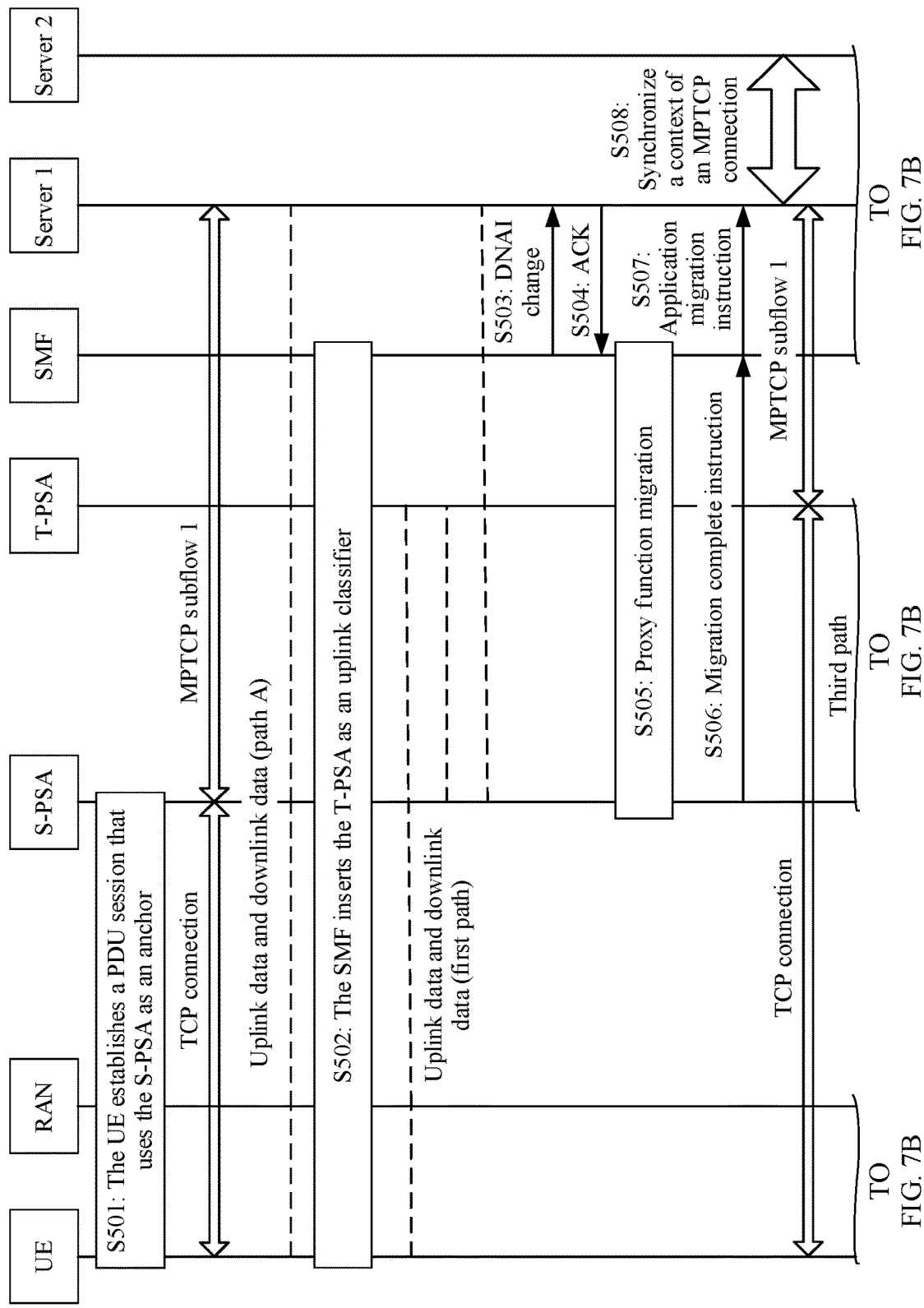
FIG. 7A and FIG. 7B are a schematic flowchart of a packet transmission method according to an embodiment of this application.
Figure 7B:
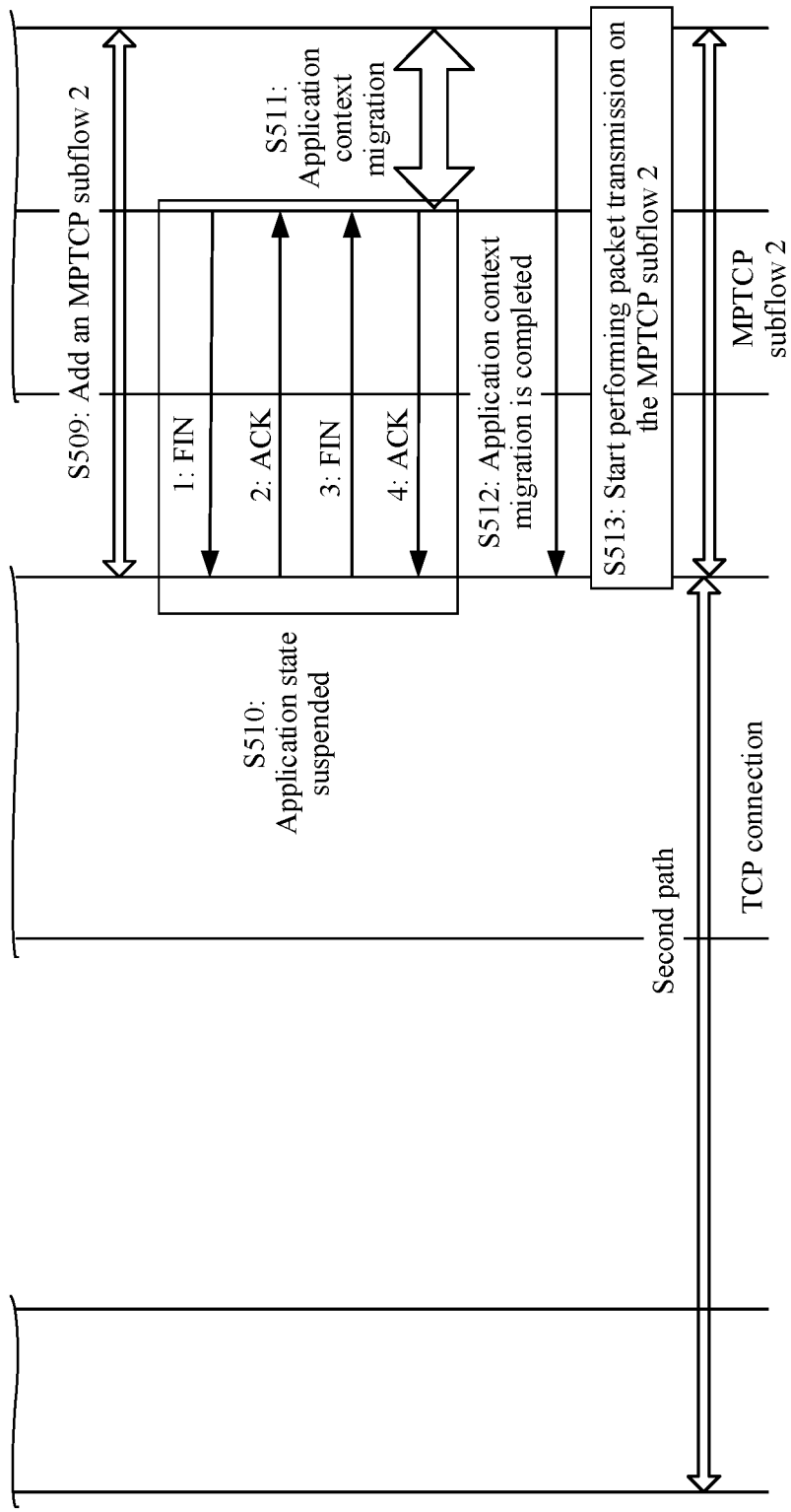

As shown in FIG. 7A and FIG. 7B, in this embodiment, the transport layer proxy function is migrated from the S-PSA to the T-PSA, to be specific, the S-PSA stops performing transport layer processing on a packet on a first path while the T-PSA starts performing transport layer processing on a packet. The T-PSA continues to transmit, on a third path, a packet obtained through the transport layer processing to the server 1, where the third path is a transition path from the first path to a second path, both the first path and the third path are paths established between the UE and the server 1, the S-PSA performs transport layer processing on the packet on the first path, the T-PSA performs transport layer processing on the packet on the third path, and the second path is a path established between the UE and the server 2. If the server 1 needs to perform application context migration with the server 2, the T-PSA stops performing packet transmission with the server 1. The server 1 needs to perform application context migration with the server 2, and after the application context migration between the server 1 and the server 2 is completed, the T-PSA starts performing packet transmission on the second path. Details are described below.

S501: The UE establishes a PDU session with the S-PSA, where a data transmission path of the PDU session is a path A in FIG. 4. In a session establishment process, the SMF delivers a forwarding rule to the S-PSA, where the forwarding rule is used to indicate that the S-PSA is to start the transport layer proxy function for a specific SDF.

For an initial connection establishment process between the UE and the server 1, refer to FIG. 13 or FIG. 16. Details are not described herein again.

S502: The UE moves, and air interface handover is performed, so that a user plane transmission path is switched from a path A to a path B in FIG. 4; and the SMF detects that the UE moves and a PSA needs to be relocated, and inserts the T-PSA as a UL CL into the user plane transmission path, so that the user plane data transmission path is switched from the path B in FIG. 4 to the first path, where the first path includes a first transport layer connection between the UE and the T-PSA and a second transport layer connection between the T-PSA and the server 1, the first transport layer connection is a TCP connection, and the second transport layer connection is an MPTCP connection.

S503: The SMF sends a DNAI change (DNAI change) notification to the server 1, where the notification includes a target DNAI and a UE ID, the UE ID is a generic public subscription identifier (Generic Public Subscription Identity, GPSI) or an IP address of the UE, and optionally, the DNAI change notification further includes an application ID (application ID).

S504: The server 1 determines that application migration can be performed, and returns an ACK to the SMF.

S505: After receiving the ACK from the server 1, the SMF determines that the application migration can be performed, and triggers the S-PSA and the T-PSA to perform transport layer proxy function migration between the S-PSA and the T-PSA, to be specific, the T-PSA starts performing transport layer processing on a packet, and the S-PSA stops performing transport layer processing on a packet. For a specific process of the transport layer proxy function migration between the S-PSA and the T-PSA, refer to the descriptions in FIG. 8 and FIG. 9. Details are not described herein.

After the transport layer proxy function migration between the S-PSA and the T-PSA is completed, the third path is established, where the third path includes a third transport layer connection and a fifth transport layer connection, where the third transport layer connection is a TCP connection between the UE and the T-PSA, and the fifth transport layer connection is an MPTCP connection between the T-PSA and the server 1 and is used to carry an MPTCP subflow 1.

S506: The S-PSA sends a migration complete instruction to the SMF, where the migration complete instruction is used to indicate that the transport layer proxy function migration is completed, to be specific, the T-PSA has started performing transport layer processing on a packet, and the S-PSA has stopped performing transport layer processing on a packet.

S507: The SMF sends an application migration instruction to the server 1, where the application migration instruction is used to indicate to perform application context migration between the server 1 and the server 2.

S508: Before the application context migration is performed between the server 1 and the server 2, the server 2 obtains, from the server 1, a part of MPTCP connection contexts unrelated to a time sequence, including key information, an encryption algorithm (for example, an HMAC-SHA256), and the like of the second transport layer connection, to facilitate establishment of a fourth transport layer connection, namely, establishment of an MPTCP connection that is between the server 2 and the T-PSA and that is used to carry an MPTCP subflow 2.

S509: The T-PSA establishes the MPTCP connection to the server 2, where the T-PSA needs to obtain an address of the server 2 before establishing the MPTCP connection. The address of the server 2 may be obtained from the SMF, or may be obtained from the server 1 by using an address addition message. This is not limited in this embodiment of this application.

S510: When the server 1 determines to perform application context migration, an application state between the T-PSA and the server 1 is suspended, to be specific, the server 1 stops sending a downlink packet to the T-PSA, and sends a "FIN" indication to the T-PSA to indicate to the T-PSA that the server 1 stops sending a packet. After receiving the "FIN" indication message sent by the server 1, the T-PSA returns an "ACK" and sends a "FIN" indication to the server 1 to indicate to the server 1 that the T-PSA stops sending a packet to the server 1.

S511: The server 1 receives the FIN indication sent by the T-PSA, and starts performing application context migration with the server 2 and migration of a context of the second transport layer connection (namely, the MPTCP connection), where the context of the second transport layer connection includes but is not limited to key information of the S-PSA, an encryption algorithm (such as the HMAC-SHA256), and the like, and the context of the second transport layer connection is used to establish the MPTCP subflow 2 between the server 2 and the T-PSA.

S512: After the application context migration between the server 1 and the server 2 is completed, the server 2 sends indication information to the T-PSA, where the indication information is used to indicate that the application context migration between the server 1 and the server 2 is completed.

S513: The T-PSA starts performing packet transmission on the MPTCP subflow 2, and deletes the MPTCP subflow 1, where, in this case, a path for the packet transmission is switched from the third path to the second path.

It may be understood that the two MPTCP subflows that share a same MPTCP connection parameter are respectively established between the T-PSA and the server 1 and between the T-PSA and the server 2. Packets may be combined and sorted on a server 2 side by using an MPTCP mechanism, to avoid a packet loss and a packet disorder that are caused during application switching.

Figure 8:
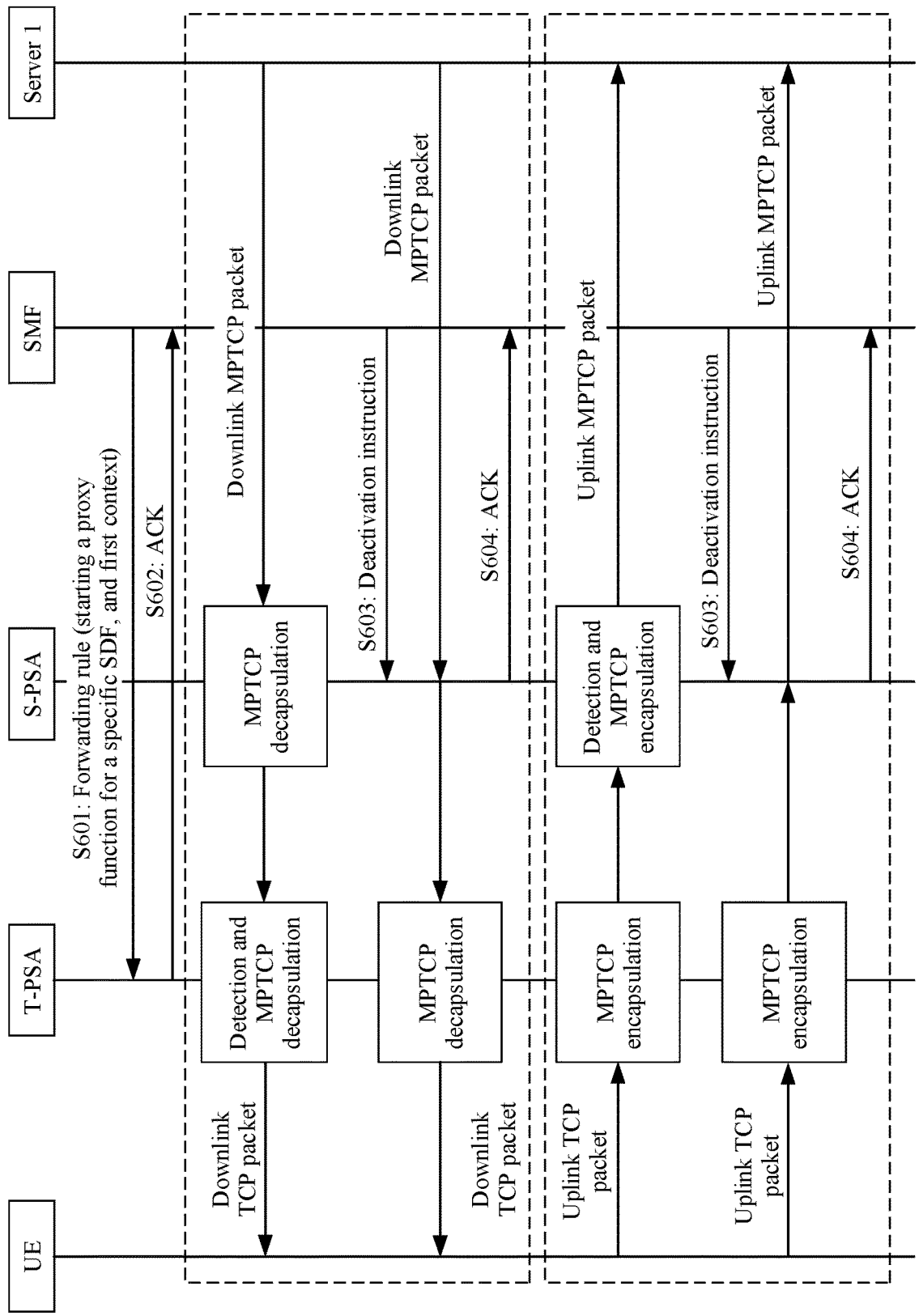
FIG. 8 is a schematic flowchart of proxy function migration according to an embodiment of this application.
Figure 9:
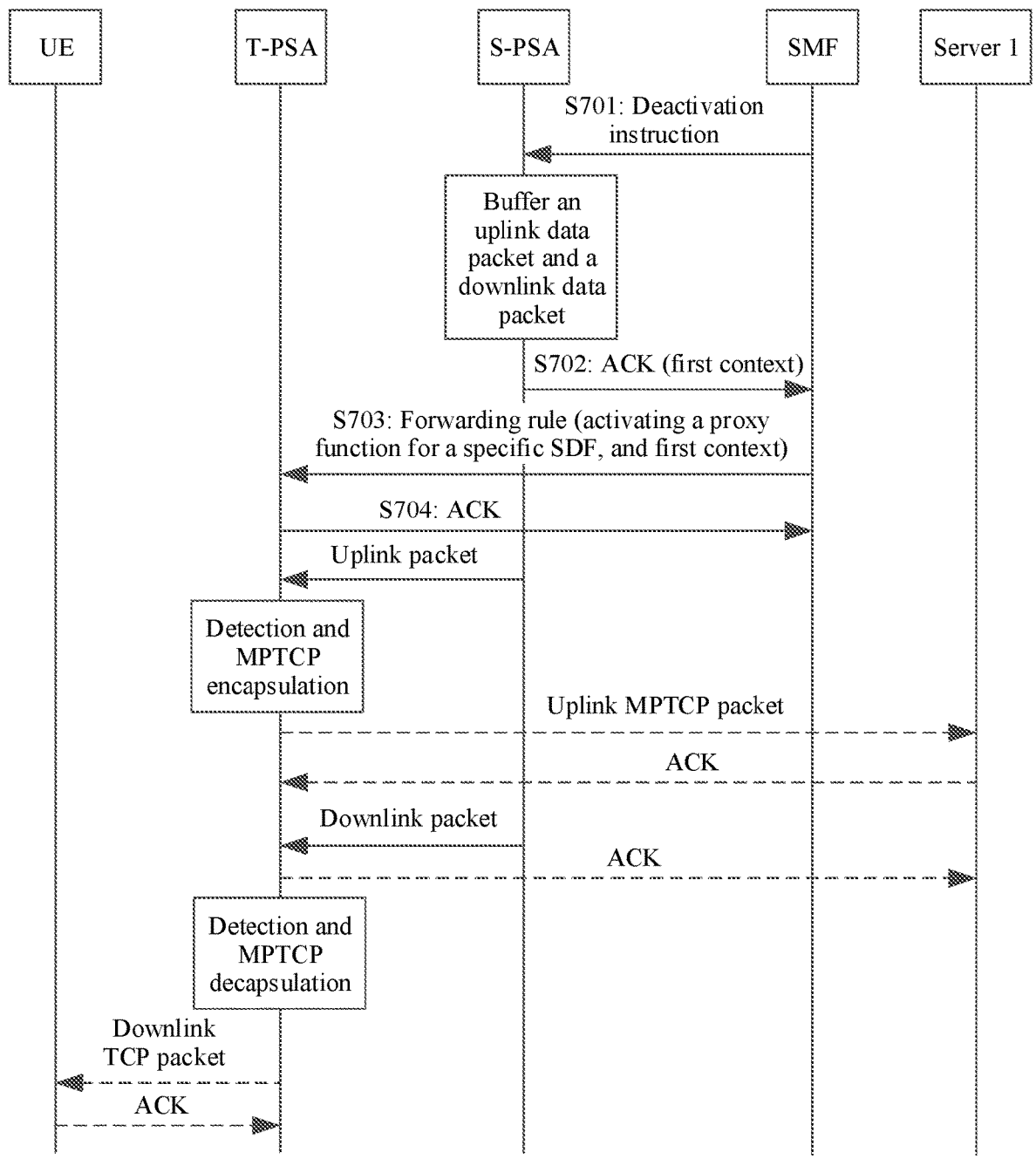
FIG. 9 is another schematic flowchart of proxy function migration according to an embodiment of this application.

With reference to FIG. 8 and FIG. 9, the following uses an example to describe the transport layer proxy function migration mentioned in step S505.

FIG. 8 is a schematic diagram of transport layer proxy function migration according to an embodiment of this application. As shown in the figure, this embodiment includes but is not limited to the following steps.

S601: After determining that application context migration can be performed, an SMF sends a notification message to a T-PSA. The notification message is used to indicate that the T-PSA is to start a transport layer proxy function for a specific SDF. Optionally, the notification message may include a first context about packet transmission of the S-PSA on a first path (the first context may be sent by an S-PSA to the SMF in advance, as shown in step 7 in FIG. 13), and the first context is a context about the packet transmission of the S-PSA on the first path. Optionally, the first context may include a first transport layer connection parameter and a second transport layer connection parameter, and the first transport layer connection parameter and the second transport layer connection parameter include but are not limited to: an IP address and a port number that are of UE, a local IP address and a port number that are of a second transport layer connection, an IP address and a port number that are of a server 1, key information and hash encryption algorithm information (where for example, an HMAC-SHA256 encryption algorithm is used) that are of two ends (the S-PSA and the server 1) of the second transport layer connection, and for a specific SDF, information unrelated to a time sequence such as a mapping relationship between a data sequence number (DSN) and a subflow sequence number (SSN), an initial subflow sequence number (ISSN), and a mapping relationship between a TCP sequence number of a first transport layer connection and an SSN. For detailed content of the HMAC-SHA256, the DSN, the SSN, the ISSN, and the like, refer to the conventional technology.

Optionally, the first context may not need to be forwarded by the SMF to the T-PSA. Instead, the S-PSA may directly send the first context to the T-PSA. For example, after the session management network element detects that the UE moves and a PSA needs to be relocated, the SMF establishes a user plane tunnel between the S-PSA and the T-PSA, and the S-PSA transmits the first context to the T-PSA through the user plane tunnel.

S602: After receiving the notification message from the SMF, the T-PSA starts the transport layer proxy function, and returns an acknowledgment message to the SMF to notify the SMF that the transport layer proxy function has been started.

After the T-PSA starts the transport layer proxy function, for a downlink packet, the T-PSA detects whether the downlink packet is a TCP packet or an MPTCP packet. If the downlink packet is the MPTCP packet, the T-PSA performs MPTCP decapsulation to generate a TCP packet, to be specific, the T-PSA encapsulates the MPTCP packet into the TCP packet based on the first context. If the downlink packet is the TCP packet, it indicates that the S-PSA has performed MPTCP decapsulation, to be specific, the S-PSA has encapsulated a downlink MPTCP packet received from the server 1 into the TCP packet based on the first context, and the T-PSA directly forwards the TCP packet to the UE.

For an uplink packet, the T-PSA performs MPTCP encapsulation on a TCP packet from the UE and sends an MPTCP packet to the S-PSA, to be specific, the T-PSA encapsulates the TCP packet into the MPTCP packet based on the first context, and the S-PSA forwards the MPTCP packet to the server 1.

S603: After receiving the acknowledgment message sent by the T-PSA in S602, the SMF sends a deactivation instruction to the S-PSA, where the deactivation instruction is used to indicate that the S-PSA is to stop performing the transport layer proxy function.

After the S-PSA receives the deactivation instruction sent by the SMF, for a downlink packet, the S-PSA directly forwards the downlink packet to the T-PSA, and the T-PSA encapsulates the downlink packet into a TCP packet based on the first context.

For an uplink packet, the S-PSA receives the uplink packet from the T-PSA, and detects whether the uplink packet is the TCP packet or the MPTCP packet. If the uplink packet is the TCP packet, it indicates that when the T-PSA starts the transport layer proxy function, the uplink packet has already been on a transmission path from the T-PSA to the S-PSA, so that the T-PSA does not encapsulate the packet into an MPTCP packet based on the first context, and in this case, the S-PSA encapsulates the uplink packet into the MPTCP packet based on the first context and sends the encapsulated MPTCP packet to the server 1. If the uplink packet from the T-PSA is the MPTCP packet, it indicates that the T-PSA has started the transport layer proxy function, and the S-PSA stops performing the transport layer proxy function. After subsequently receiving the uplink packet from the T-PSA, the S-PSA directly forwards the packet without detection.

S604: After stopping performing the transport layer proxy function, the S-PSA sends an acknowledgment message to the SMF, to indicate that the transport layer proxy function is completed, and trigger the SMF to send an application context migration instruction to the server 1.

FIG. 9 is another schematic diagram of transport layer proxy function migration according to an embodiment of this application. As shown in the figure, this embodiment includes but is not limited to the following steps.

S701: After determining that application context migration can be performed, an SMF sends a deactivation instruction to an S-PSA, where the deactivation instruction is used to indicate that the S-PSA is to stop performing a transport layer proxy function for a specific SDF.

S702: The S-PSA buffers an uplink packet and a downlink packet that are not forwarded, and returns an acknowledgment (ACK) message to the SMF, where the ACK is used to indicate that the S-PSA has stopped performing the transport layer proxy function, the acknowledgment message includes a first context about packet transmission of the S-PSA on a first path, and the first context includes a first transport layer connection parameter, a first transmission state parameter, a second transport layer connection parameter, and a second transmission state parameter.

The first transport layer connection parameter and the second transport layer connection parameter may include but are not limited to: an IP address and a port number that are of UE, a local IP address and a port number that are of a second transport layer connection, an IP address and a port number that are of a server 1, key information and hash encryption algorithm information (where for example, an HMAC-SHA256 encryption algorithm is used) that are of two ends (the S-PSA and the server 1) of the second transport layer connection, and for a specific SDF, information unrelated to a time sequence such as a mapping relationship between a data sequence number (data sequence number, DSN) and a subflow sequence number (subflow sequence number, SSN), an initial subflow sequence number (initial subflow sequence number, ISSN), and a mapping relationship between a TCP sequence number of a first transport layer connection and an SSN. For detailed content of the HMAC-SHA256, the DSN, the SSN, the ISSN, and the like, refer to the conventional technology.

The first transmission state parameter and the second transmission state parameter may include but are not limited to: a sequence number of a received uplink packet, a sequence number of a sent downlink packet, a sequence number of a sent uplink ACK, a sequence number of a received downlink ACK, and the like of the first transport layer connection (that is, a TCP connection); and a sequence number of a sent uplink packet, a sequence number of a received downlink packet, a sequence number of a received uplink ACK, a sequence number of a sent downlink ACK, and the like of the second transport layer connection (that is, an MPTCP connection).

The sequence number of the received uplink packet of the first transport layer connection refers to a TCP sequence number of a packet that is in packets buffered by the S-PSA, that is an uplink TCP packet sent by the UE and received by the S-PSA, but for which an ACK is not returned. The sequence number of the sent downlink packet of the first transport layer connection refers to a TCP sequence number of a packet that is in the packets buffered by the S-PSA, that is a packet sent by the S-PSA to the UE, but for which an ACK returned by the UE is not received. The sequence number of the sent uplink ACK of the first transport layer connection refers to a TCP sequence number of a packet that is in the packets buffered by the S-PSA, that is an uplink packet sent by the UE, and for which an ACK has been fed back by the S-PSA. The sequence number of the received downlink ACK of the first transport layer connection refers to a TCP sequence number of a packet that is in the packets buffered by the S-PSA, that is a downlink packet sent by the S-PSA to the UE, and for which an ACK fed back by the UE has been received.

The sequence number of the sent uplink packet of the second transport layer connection refers to a TCP sequence number of a packet that is in the packets buffered by the S-PSA, that is a packet sent by the S-PSA to the server 1, but for which an ACK returned by the server 1 is not received. The sequence number of the received downlink packet of the second transport layer connection refers to a TCP sequence number of a packet that is in the packets buffered by the S-PSA, that is a downlink packet sent by the server 1 and received by the S-PSA, but for which an ACK is not returned to the server 1. The sequence number of the received uplink ACK of the second transport layer connection refers to a TCP sequence number of a packet that is in the packets buffered by the S-PSA, that is an uplink packet sent by the S-PSA to the server 1, and for which an ACK fed back by the server 1 has been received. The sequence number of the sent downlink ACK of the second transport layer connection refers to a TCP sequence number of a packet that is in the packets buffered by the S-PSA, that is a downlink TCP packet sent by the server 1, and for which an ACK fed back by the server 1 has been received by the S-PSA.

The first transport layer connection parameter and the second transport layer connection parameter are parameters unrelated to the time sequence, and the first transmission state parameter and the second transmission state parameter are parameters related to the time sequence.

S703: The SMF sends a notification message to a T-PSA, where the notification message is used to indicate that the T-PSA is to start the transport layer proxy function for the specific SDF, and the notification message includes the first context in S702.

S704: The T-PSA starts the transport layer proxy function based on an indication from the SMF, and returns an ACK to the SMF.

Correspondingly, the S-PSA further needs to forward, to the T-PSA, a received uplink packet that is not sent to the server 1 or for which an ACK is not received from the server 1, and forward, to the T-PSA, a received downlink packet that is not sent to the UE or for which an ACK is not received from the UE.

For processing manners of an uplink packet and a downlink packet by the T-PSA, refer to the processing manners in FIG. 17 and FIG. 18. Specifically and optionally, for a downlink packet, after receiving the downlink packet sent by the S-PSA, if the T-PSA does not send an ACK for the downlink packet, the T-PSA returns the ACK for the downlink packet to the server 1. Further, optionally, if the downlink packet has not been sent to the UE, and if the downlink packet is an MPTCP packet, MPTCP decapsulation is performed to generate a TCP packet, to be specific, the T-PSA encapsulates the MPTCP packet into the TCP packet based on the first context, and then sends the TCP packet to the UE; or if the downlink packet is a TCP packet, the T-PSA directly forwards the TCP packet to the UE. Optionally, the T-PSA may first send a downlink packet buffered by the S-PSA to the UE. The T-PSA buffers the downlink packet before an ACK returned by the UE for the downlink packet is received.

For an uplink packet, after receiving the uplink packet sent by the S-PSA, if the T-PSA does not send an ACK for the uplink packet, the T-PSA returns the ACK to the UE. Further, optionally, if the uplink packet has not been sent to the server 1, and if the uplink packet is a TCP packet, MPTCP encapsulation is performed to generate an MPTCP packet, to be specific, the T-PSA encapsulates the TCP packet into an MPTCP packet based on the first context, and then sends the MPTCP packet to the server 1; or if the uplink packet is an MPTCP packet, the T-PSA directly forwards the MPTCP packet to the server 1. Optionally, the T-PSA may first send an uplink packet buffered by the S-PSA to the server 1. The T-PSA buffers the uplink packet before an ACK returned by the server 1 for the uplink packet is received.

Figure 10B:
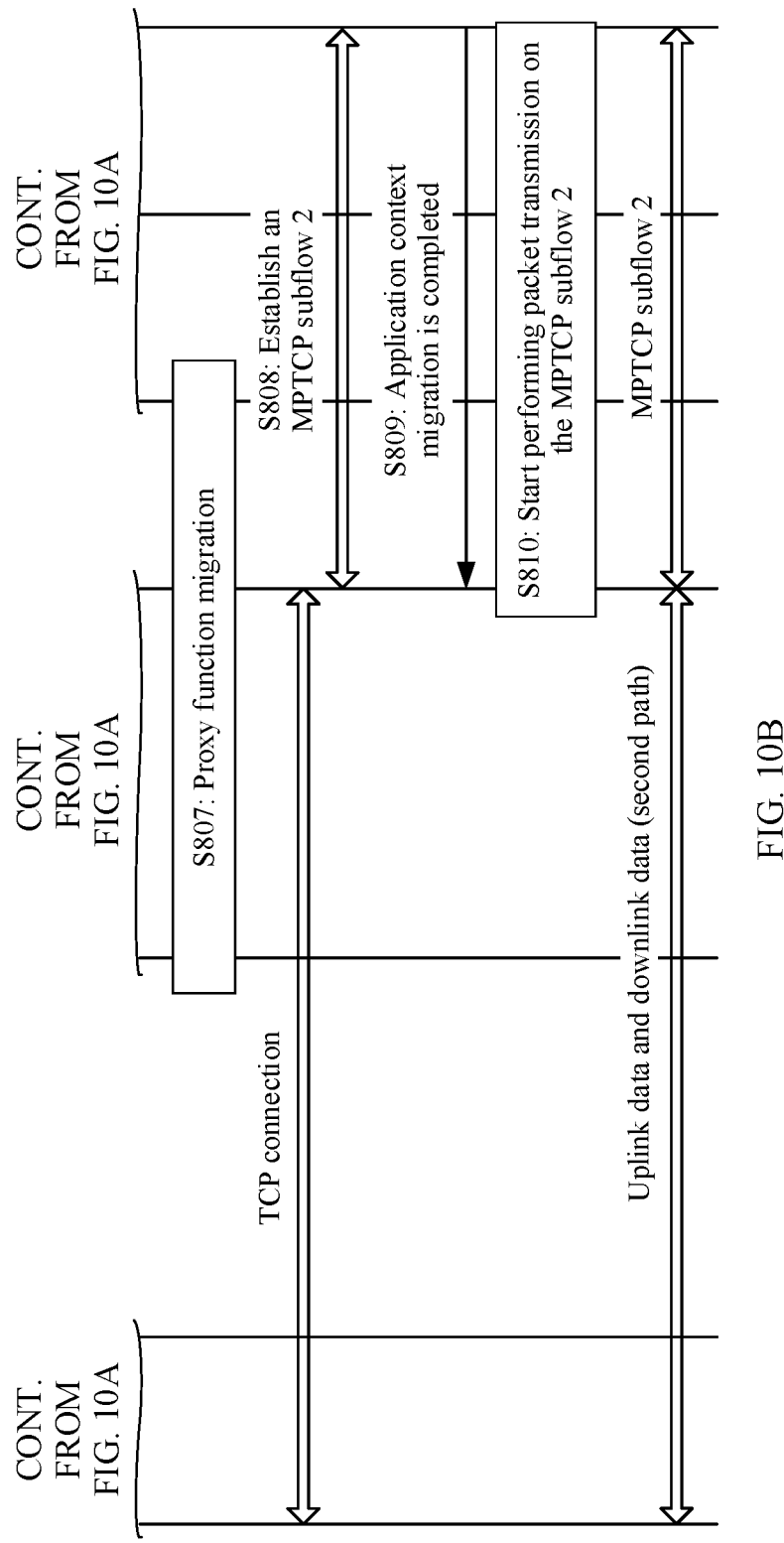

As shown in FIG. 10A and FIG. 10B, in this embodiment, before transport layer proxy function migration between the S-PSA and the T-PSA and before application context migration between the server 1 and the server 2, packet transmission is stopped between the S-PSA and the server 1, and the transport layer proxy function is migrated from the S-PSA to the T-PSA, to be specific, the S-PSA stops performing transport layer processing on a packet on a first path while the T-PSA starts performing transport layer processing on a packet. The application context migration between the server 1 and the server 2 is performed. After the transport layer proxy function migration and the application context migration are completed, the T-PSA starts performing packet transmission on a second path. In this embodiment, the transport layer proxy function migration and the application context migration may be performed at the same time. Details are described below.

S801: UE establishes a PDU session with the S-PSA, where a data transmission path of the PDU session is a path A in FIG. 4. In a session establishment process, an SMF delivers a forwarding rule to the S-PSA, where the forwarding rule is used to indicate that the S-PSA is to start the transport layer proxy function for a specific SDF.

For an initial connection establishment process between the UE and the server 1, refer to FIG. 13 or FIG. 16. Details are not described herein again.

S802: The UE moves, and air interface handover is performed, so that a user plane transmission path is switched from the path A to a path B in FIG. 4; and the SMF detects that the UE moves and a PSA needs to be relocated, and inserts the T-PSA as a UL CL into the user plane transmission path, so that the user plane data transmission path is switched from the path B in FIG. 4 to the first path, where the first path includes a first transport layer connection between the UE and the T-PSA and a second transport layer connection between the T-PSA and the server 1, the first transport layer connection is a TCP connection, and the second transport layer connection is an MPTCP connection.

S803: The SMF sends a DNAI change (DNAI change) notification to the server 1, where the notification includes a target DNAI and a UE ID, the UE ID may be a GPSI or a UE IP, and optionally, the DNAI change notification further includes an application ID (application ID).

S804: The server 1 determines that application migration can be performed, and returns an ACK to the SMF.

S805: Before the application context migration is performed between the server 1 and the server 2, the server 1 stops sending a packet to the UE, and sends a "FIN" indication to the S-PSA to indicate to the S-PSA that the server 1 stops sending a packet. After receiving the "FIN" indication message sent by the server 1, the S-PSA returns an "ACK" and sends a "FIN" indication to the server 1 to indicate to the server 1 that S-PSA stops sending a packet to the server 1. An application state between the S-PSA and the server 1 is suspended.

S806: The server 1 receives the "FIN" indication sent by the S-PSA, and starts performing application context migration with the server 2 and migration of a context of the second transport layer connection (namely, the MPTCP connection), where the context of the second transport layer connection includes but is not limited to key information of the S-PSA, an encryption algorithm (such as an HMAC-SHA256), and the like, and the context of the second transport layer connection is used to establish an MPTCP subflow 2 between the server 2 and the T-PSA.

S807: After receiving an ACK sent by the server 1 (that is, step 4 in S805), the S-PSA starts performing transport layer proxy function migration between the S-PSA and the T-PSA, or the S-PSA notifies the SMF, and the SMF starts performing transport layer proxy function migration between the S-PSA and the T-PSA. Specifically and optionally, for a process of the transport layer proxy function migration between the S-PSA and the T-PSA, refer to FIG. 11 and FIG. 12. Details are not described herein.

S808: The T-PSA triggers establishment of an MPTCP subflow 2 between the T-PSA and the server 2, namely, establishment of a fourth transport layer connection.

S809: The T-PSA receives indication information sent by the server 1, where the indication information is used to indicate that the application context migration between the server 1 and the server 2 is completed.

S810: The T-PSA starts performing packet transmission on the MPTCP subflow 2, so that a packet transmission path is switched from the first path to the second path, where the second path includes a third transport layer connection between the UE and the T-PSA and the fourth transport layer connection between the T-PSA and the server 2, the third transport layer connection is a TCP connection, and the fourth transport layer connection is an MPTCP connection.

It may be understood that two MPTCP subflows that share a same MPTCP connection parameter are respectively established between the T-PSA and the server 1 and between the T-PSA and the server 2. Packets may be combined and sorted on a server 2 side by using an MPTCP mechanism, to avoid a packet loss and a packet disorder that are caused during application switching.

Figure 11:
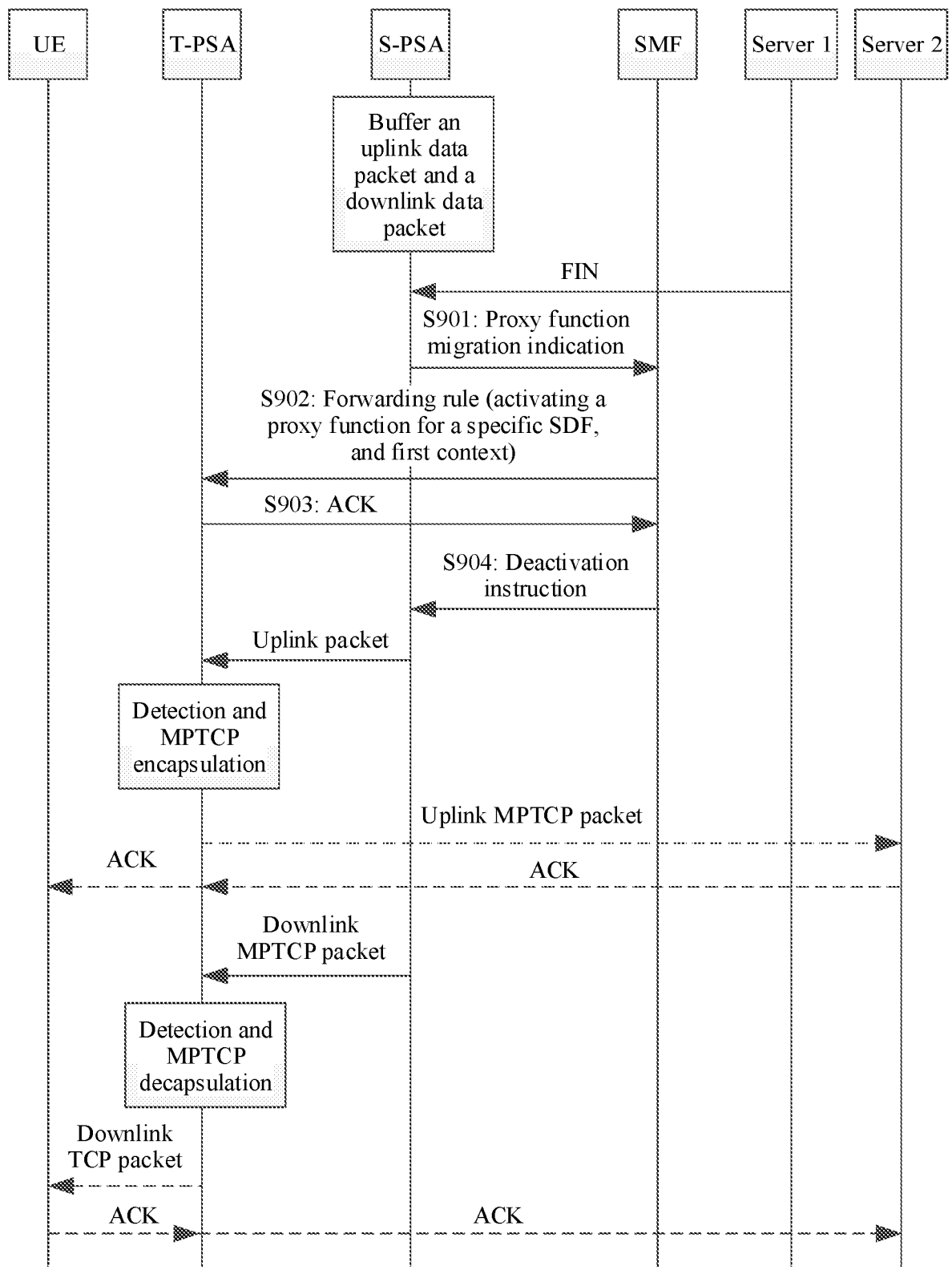
FIG. 11 is a schematic flowchart of proxy function migration according to an embodiment of this application.
Figure 12:
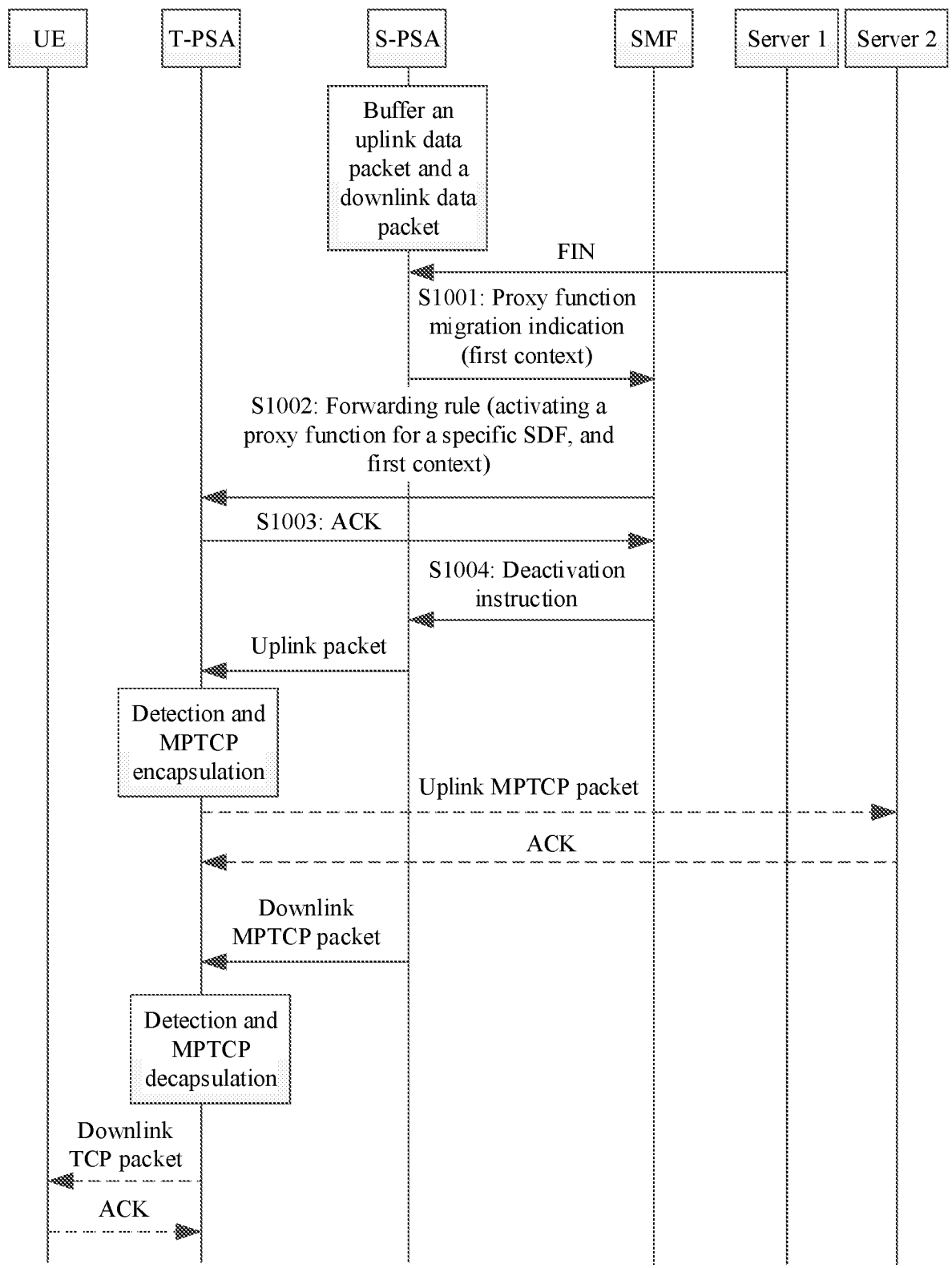
FIG. 12 is another schematic flowchart of proxy function migration according to an embodiment of this application.

With reference to FIG. 11 and FIG. 12, the following uses an example to describe the transport layer proxy function migration mentioned in step S807.

FIG. 11 is a schematic diagram of transport layer proxy function migration according to an embodiment of this application. A packet transmission manner in this embodiment may be the packet transmission manners shown in FIG. 14 and FIG. 15. An uplink data packet and a downlink data packet that are buffered by an S-PSA may be packets that are received by the S-PSA but are not sent by the S-PSA. As shown in the figure, this embodiment includes but is not limited to the following steps.

S901: After receiving a "FIN" sent by a server 1, the S-PSA sends a transport layer proxy function migration indication to an SMF.

S902: The SMF sends a notification message to a T-PSA. The notification message indicates the T-PSA to start a transport layer proxy function for a specific SDF. Optionally, the notification message includes a first context about packet transmission of the S-PSA on a first path, and the first context may be obtained by performing step 7 in FIG. 13.

Optionally, the first context may not be forwarded by the SMF. Instead, the S-PSA may directly send the first context to the T-PSA. For example, after the session management network element detects that UE moves and a PSA needs to be relocated, the SMF establishes a user plane tunnel between the S-PSA and the T-PSA, and the S-PSA transmits the first context to the T-PSA through the user plane tunnel.

Specifically and optionally, the first context may include a first transport layer connection parameter and a second transport layer connection parameter, and the first transport layer connection parameter and the second transport layer connection parameter include but are not limited to: an IP address and a port number that are of the UE, a local IP address and a port number that are of a second transport layer connection, an IP address and a port number that are of the server 1, key information and hash encryption algorithm information (where for example, an HMAC-SHA256 encryption algorithm is used) that are of two ends (the S-PSA and the server 1) of the second transport layer connection, and for the specific SDF, information unrelated to a time sequence such as a mapping relationship between a data sequence number (DSN) and a subflow sequence number (SSN), an initial subflow sequence number (ISSN), and a mapping relationship between a TCP sequence number of a first transport layer connection and an SSN. For detailed content of the HMAC-SHA256, the DSN, the SSN, the ISSN, and the like, refer to the conventional technology.

S903: After receiving the notification message from the SMF, the T-PSA starts the transport layer proxy function, and returns an ACK to the SMF.

S904: The SMF sends a deactivation instruction to the S-PSA, where the deactivation instruction is used to indicate that the S-PSA is to stop performing the transport layer proxy function.

Specifically and optionally, after sending a "FIN" to the server 1, that is, after stopping sending a packet to the server 1, the S-PSA sends the buffered uplink packet and downlink packet to the T-PSA.

For a downlink packet, the T-PSA detects whether the downlink packet is a TCP packet or an MPTCP packet. If the downlink packet is the MPTCP packet, the T-PSA performs MPTCP decapsulation to generate a TCP packet, to be specific, the T-PSA encapsulates the MPTCP packet into the TCP packet based on a second context, where the second context is determined by the T-PSA based on the first context and a context of a fourth transport layer connection, and sends the TCP packet to the UE. If the downlink packet is the TCP packet, the T-PSA directly forwards the TCP packet to the UE. If the T-PSA receives an ACK returned by the UE for the downlink packet, the T-PSA sends an ACK to a server 2. Optionally, the T-PSA preferably processes the downlink packet that is sent by the S-PSA and that is buffered by the S-PSA.

For an uplink packet, the T-PSA detects whether the uplink packet is a TCP packet or an MPTCP packet. If the uplink packet is the TCP packet, the T-PSA performs MPTCP encapsulation to generate an MPTCP packet, to be specific, the T-PSA encapsulates the TCP packet into the MPTCP packet based on the second context, and sends the MPTCP packet to the server 2, where the second context is determined by the T-PSA based on the first context and the context of the fourth transport layer connection. If the uplink packet is the MPTCP packet, the T-PSA directly forwards the MPTCP packet to the server 2. If the T-PSA receives an ACK returned by the server 2 for the uplink packet, the T-PSA sends an ACK to the UE. Optionally, the T-PSA preferably processes the uplink packet that is sent by the S-PSA and that is buffered by the S-PSA.

FIG. 12 is another schematic diagram of transport layer proxy function migration according to an embodiment of this application. A packet transmission manner in this embodiment may be the packet transmission manner shown in FIG. 17 or FIG. 18. An uplink data packet and a downlink data packet that are buffered by an S-PSA may be a packet that is received by the S-PSA but that is not sent and/or a packet that is received by the S-PSA but for which an ACK is not received. For example, although an uplink packet is sent to a server 1, an ACK that is for the uplink packet and that is returned by the server 1 is not received, in this case, the S-PSA also buffers the uplink packet. For another example, although a downlink packet is sent to UE, an ACK that is for the downlink packet and that is returned by the UE is not received, in this case, the S-PSA also buffers the downlink packet. As shown in the figure, this embodiment includes but is not limited to the following steps.

S1001: After receiving a FIN sent by the server 1, the S-PSA sends a transport layer proxy function migration indication to an SMF, where the transport layer proxy function migration indication may include a first context about packet transmission of the S-PSA on a first path, and the first context includes a first transport layer connection parameter, a first transmission state parameter, a second transport layer connection parameter, and a second transmission state parameter.

The first transport layer connection parameter and the second transport layer connection parameter may include but are not limited to: an IP address and a port number that are of the UE, a local IP address and a port number that are of a second transport layer connection, an IP address and a port number that are of the server 1, key information and hash encryption algorithm information (where for example, an HMAC-SHA256 encryption algorithm is used) that are of two ends (the S-PSA and the server 1) of the second transport layer connection, and for a specific SDF, information unrelated to a time sequence such as a mapping relationship between a data sequence number (DSN) and a subflow sequence number (SSN), an initial subflow sequence number (ISSN), and a mapping relationship between a TCP sequence number of a first transport layer connection and an SSN. For detailed content of the HMAC-SHA256, the DSN, the SSN, the ISSN, and the like, refer to the conventional technology.

The first transmission state parameter and the second transmission state parameter may include but are not limited to:

a sequence number of a received uplink packet, a sequence number of a sent downlink packet, a sequence number of a sent uplink ACK, a sequence number of a received downlink ACK, and the like of the first transport layer connection (that is, a TCP connection); and a sequence number of a sent uplink packet, a sequence number of a received downlink packet, a sequence number of a received uplink ACK, a sequence number of a sent downlink ACK, and the like of the second transport layer connection (that is, an MPTCP connection).

For descriptions of the first transmission state parameter and the second transmission state parameter, refer to the descriptions in the foregoing embodiment. Details are not described herein again.

S1002: The SMF sends a notification message to a T-PSA, where the notification message is used to indicate the T-PSA to start a transport layer proxy function for the specific SDF, and the notification message includes the first context included in the transport layer proxy function migration indication in step S1001.

S1003: After receiving an indication from the SMF, the T-PSA starts the transport layer proxy function, and returns an ACK to the SMF.

S1004: After receiving the ACK returned by the T-PSA, the SMF determines that the T-PSA has started the transport layer proxy function, and the SMF sends a deactivation instruction to the S-PSA.

Correspondingly, the S-PSA sends the buffered uplink packet and downlink packet to the T-PSA.

For processing manners of an uplink packet and a downlink packet by the T-PSA, refer to the processing manners in FIG. 17 and FIG. 18. Specifically and optionally, for a downlink packet, after receiving the downlink packet sent by the S-PSA, the T-PSA determines, based on the first transmission state parameter and the second transmission state parameter, that an ACK for the downlink packet is not sent, and returns the ACK for the downlink packet to a server 2. Further, optionally, if the downlink packet has not been sent to the UE, and if the downlink packet is an MPTCP packet, MPTCP decapsulation is performed to generate a TCP packet, to be specific, the T-PSA decapsulates the MPTCP packet into the TCP packet based on a second context, and then sends the TCP packet to the UE, where the second context is determined by the T-PSA based on the first context and a context of a fourth transport layer connection. If the downlink packet is a TCP packet, the T-PSA directly forwards the downlink packet to the UE. Optionally, the T-PSA may first send a downlink packet buffered by the S-PSA to the UE. The T-PSA buffers the downlink packet before an ACK returned by the UE for the downlink packet is received.

For an uplink packet, after receiving the uplink packet sent by the S-PSA, the T-PSA determines, based on the first transmission state parameter and the second transmission state parameter, that an ACK for the uplink packet is not sent, and returns the ACK for the uplink packet to the UE. Further, optionally, if the uplink packet has not been sent to the server 1, and if the uplink packet is a TCP packet, MPTCP encapsulation is performed to generate an MPTCP packet, to be specific, the T-PSA encapsulates the TCP packet into the MPTCP packet based on the second context, and then sends the MPTCP packet to the server 2, where the second context is determined by the T-PSA based on the first context and the context of the fourth transport layer connection. If the uplink packet is an MPTCP packet, the T-PSA directly forwards the uplink packet to the server 2. Optionally, the T-PSA may first send an uplink packet buffered by the S-PSA to the server 2. The T-PSA buffers the uplink packet before an ACK returned by the server 1 for the uplink packet is received.

The foregoing describes in detail the methods provided in embodiments of this application with reference to FIG. 3 to FIG. 18. Apparatuses provided in embodiments of this application are described in detail below with reference to FIG. 19 to FIG. 21.

Figure 19:
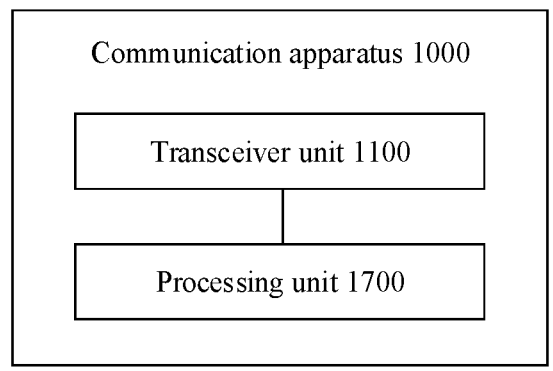
FIG. 19 is a schematic block diagram of a communication apparatus according to an embodiment of this application.

FIG. 19 is a schematic block diagram of a communication apparatus according to an embodiment of this application. As shown in FIG. 19, the communication apparatus 1700 may include a transceiver unit 1710 and a processing unit 1720.

The transceiver unit 1710 may be configured to receive information (or a message) sent by another apparatus, and may be further configured to send information (or a message) to the another apparatus. The processing unit 1720 may be configured to perform internal processing of the apparatus.

In an embodiment, the communication apparatus 1700 may correspond to the source transport layer proxy network element (for example, the S-PSA) in the foregoing method embodiments. For example, the communication apparatus 1700 may be a source transport layer proxy network element, or may be a chip in the source transport layer proxy network element. The communication apparatus 1700 may include units configured to perform operations performed by the source transport layer proxy network element in the foregoing method embodiments. In addition, the units in the communication apparatus 1700 are separately configured to perform the operations performed by the source transport layer proxy network element in the foregoing method embodiments.

For example, the processing unit 1720 is configured to: if the transceiver unit 1710 receives third indication information, stop performing transport layer processing on a packet on a first path based on a first context of the source transport layer proxy network element, where the first context is a context about packet transmission of the source transport layer proxy network element on the first path.

The first context is used by a target transport layer proxy network element to establish a fourth transport layer connection. When receiving first indication information, the target transport layer proxy network element performs transport layer processing on a packet on a second path based on a second context of the target transport layer proxy network element, where the second context is determined based on the first context and a context of the fourth transport layer connection, and the first indication information is used to indicate that application context migration between a first application server and a second application server is completed, where when the application context migration is being performed, packet transmission between the first application server and a proxy network element is stopped; and the proxy network element includes the source transport layer proxy network element or the target transport layer proxy network element.

The first path is a path established between a terminal device and the first application server, the first path includes a first transport layer connection and a second transport layer connection, the first transport layer connection is a transport layer connection between the source transport layer proxy network element and the terminal device. The second transport layer connection is a transport layer connection between the source transport layer proxy network element and the first application server; and the second path includes a third transport layer connection and the fourth transport layer connection, the third transport layer connection is a transport layer connection between the target transport layer proxy network element and the terminal device, and the fourth transport layer connection is a transport layer connection between the target transport layer proxy network element and the second application server.

In an embodiment, the communication apparatus 1700 may correspond to the target transport layer proxy network element (for example, the T-PSA) in the foregoing method embodiments. For example, the communication apparatus 1700 may be a target transport layer proxy network element, or may be a chip in the target transport layer proxy network element. The communication apparatus 1700 may include units configured to perform operations performed by the target transport layer proxy network element in the foregoing method embodiments. In addition, the units in the communication apparatus 1700 are separately configured to perform the operations performed by the target transport layer proxy network element in the foregoing method embodiments.

For example, the processing unit 1720 is configured to establish a fourth transport layer connection based on a first context of a source transport layer proxy network element, where the first context is a context about packet transmission of the source transport layer proxy network element on a first path. The transceiver unit 1710 is configured to receive first indication information, where the first indication information is used to indicate that application context migration between a first application server and a second application server is completed. The processing unit 1720 is configured to perform transport layer processing on a packet on a second path based on a second context of the target transport layer proxy network element. The transceiver unit 1710 is further configured to transmit, on the second path, a packet obtained through the transport layer processing. The second context is determined based on the first context and a context of the fourth transport layer connection. When the application context migration is being performed, packet transmission between the first application server and a transport layer proxy network element is stopped; and the transport layer proxy network element includes the source transport layer proxy network element or the target transport layer proxy network element.

The first path is a path established between a terminal device and the first application server, the first path includes a first transport layer connection and a second transport layer connection, the first transport layer connection is a transport layer connection between the source transport layer proxy network element and the terminal device, and the second transport layer connection is a transport layer connection between the source transport layer proxy network element and the first application server; and the second path includes a third transport layer connection and the fourth transport layer connection, the third transport layer connection is a transport layer connection between the target transport layer proxy network element and the terminal device, and the fourth transport layer connection is a transport layer connection between the target transport layer proxy network element and the second application server.

In an embodiment, the communication apparatus 1700 may correspond to the session management network element (for example, the SMF) in the foregoing method embodiments. For example, the communication apparatus 1700 may be a session management network element, or may be a chip in the session management network element. The communication apparatus 1700 may include units configured to perform operations performed by the session management network element in the foregoing method embodiments. In addition, the units in the communication apparatus 1700 are separately configured to perform the operations performed by the session management network element in the foregoing method embodiments.

In an embodiment, the communication apparatus 1700 may correspond to the first application server (for example, the server 1) in the foregoing method embodiments. For example, the communication apparatus 1700 may be a first application server, or may be a chip in the first application server. The communication apparatus 1700 may include units configured to perform operations performed by the first application server in the foregoing method embodiments. In addition, the units in the communication apparatus 1700 are separately configured to perform the operations performed by the first application server in the foregoing method embodiments.

In an embodiment, the communication apparatus 1700 may correspond to the second application server (for example, the server 2) in the foregoing method embodiments. For example, the communication apparatus 1700 may be a second application server, or may be a chip in the second application server. The communication apparatus 1700 may include units configured to perform operations performed by the second application server in the foregoing method embodiments. In addition, the units in the communication apparatus 1700 are separately configured to perform the operations performed by the second application server in the foregoing method embodiments.

In an embodiment, the communication apparatus 1700 may correspond to the UE in the foregoing method embodiments. For example, the communication apparatus 1700 may be UE, or may be a chip in the UE. The communication apparatus 1700 may include units configured to perform operations performed by the UE in the foregoing method embodiments. In addition, the units in the communication apparatus 1700 are separately configured to perform the operations performed by the UE in the foregoing method embodiments.

Figure 20:
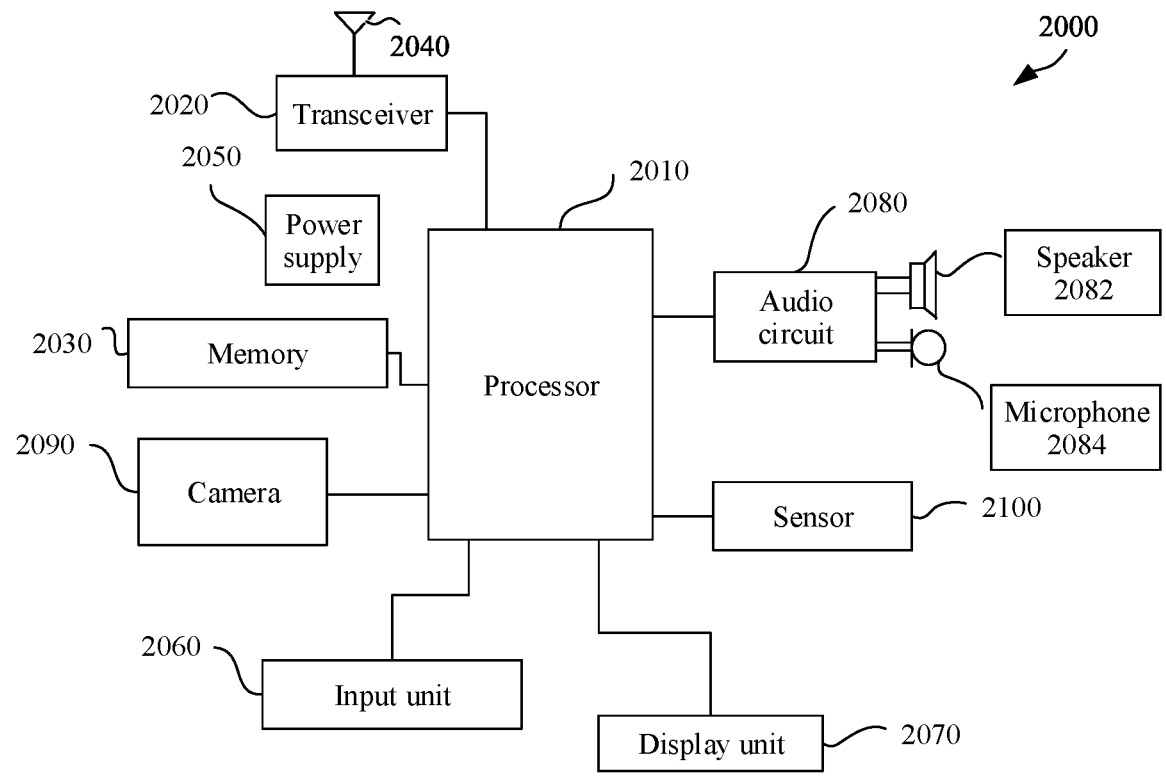
FIG. 20 is a schematic diagram of a structure of a terminal device according to an embodiment of this application.

It should be understood that when the communication apparatus 1700 is the UE, the transceiver unit 1710 in the communication apparatus 1700 may correspond to a transceiver 2020 in a terminal device 2000 shown in FIG. 20, and the processing unit 1720 in the communication apparatus 1700 may correspond to a processor 2010 in the terminal device 2000 shown in FIG. 19.

It should be further understood that, when the communication apparatus 1700 is a chip disposed in the UE, the transceiver unit 1710 in the communication apparatus 1700 may be an input/output interface.

Figure 21:
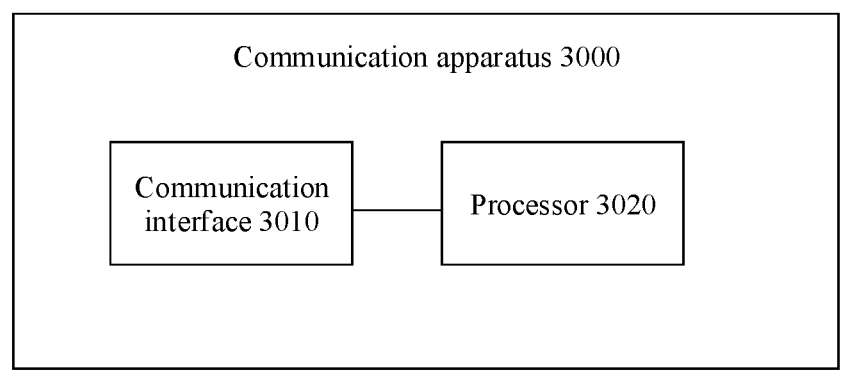
FIG. 21 is a schematic block diagram of another communication apparatus according to an embodiment of this application.

It should be understood that when the communication apparatus 1700 corresponds to the source transport layer proxy network element, the target transport layer proxy network element, the first application server, the second application server, or the session management network element, the transceiver unit 1710 in the communication apparatus 1700 may correspond to a communication interface 3010 shown in FIG. 21, and the processing unit 1720 may correspond to a processor 3020 shown in FIG. 21.

FIG. 20 is a schematic diagram of a structure of a terminal device 2000 according to an embodiment of this application. The terminal device 2000 may be used in the system shown in FIG. 1, to perform a function of the terminal device (or the UE) in the foregoing method embodiments. As shown in FIG. 20, the terminal device 2000 includes a processor 2010 and a transceiver 2020. Optionally, the terminal device 2000 further includes a memory 2030. The processor 2010, the transceiver 2002, and the memory 2030 may communicate with each other through an internal connection path, to transfer a control signal or a data signal. The memory 2030 is configured to store a computer program. The processor 2010 is configured to invoke the computer program from the memory 2030 and run the computer program, to control the transceiver 2020 to receive and send a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may alternatively be integrated into the processor 2010, or may be independent of the processor 2010. The processor 2010 may correspond to the processing unit in FIG. 19.

The transceiver 2020 may correspond to the transceiver unit in FIG. 19. The transceiver 2020 may include a receiver (or referred to as a receiver circuit) and a transmitter (or referred to as a transmitter circuit). The receiver is configured to receive a signal, and the transmitter is configured to transmit a signal.

It should be understood that, the terminal device 2000 shown in FIG. 20 can implement processes related to the terminal device in any method embodiment in the foregoing method embodiments. Operations or functions of modules in the terminal device 2000 are intended to implement corresponding processes in the foregoing method embodiments. For details, refer to the descriptions in the foregoing method embodiments. To avoid repetition, detailed descriptions are appropriately omitted herein.

The processor 2010 may be configured to perform an action that is implemented inside the terminal device and that is described in the foregoing method embodiments. The transceiver 2020 may be configured to perform an action that is of sending information by the terminal device to a network device or receiving information by the terminal device from the network device and that is described in the foregoing method embodiments. For details, refer to the descriptions in the foregoing method embodiments. Details are not described herein again.

Optionally, the terminal device 2000 may further include a power supply 2050, configured to supply power to various components or circuits in the terminal device.

In addition, to improve the functions of the terminal device, the terminal device 2000 may further include one or more of an input unit 2060, a display unit 2070, an audio circuit 2080, a camera 2090, a sensor 2100, and the like, and the audio circuit may further include a speaker 2082, a microphone 2084, and the like.

FIG. 21 is a schematic diagram of a structure of a communication apparatus according to an embodiment of this application. It should be understood that the communication apparatus 1900 shown in FIG. 21 is merely an example. The communication apparatus in embodiments of this application may further include other modules or units, or may include modules having functions similar to those of modules in FIG. 21, or may not necessarily include all modules in FIG. 21.

The communication apparatus 1900 includes a communication interface 3010 and at least one processor 3020.

The communication apparatus 1900 may correspond to any network element including a source transport layer proxy network element, a target transport layer proxy network element, a first application server, a second application server, or a session management network element. The at least one processor 3020 executes program instructions, to enable the communication apparatus 1900 to implement a corresponding process of the method performed by a corresponding network element in the foregoing method embodiments.

Optionally, the communication apparatus 1900 may further include a memory. The memory may store the program instructions, and the at least one processor 3020 may read the program instructions stored in the memory and execute the program instructions.

The processor in this embodiment of this application may be a central processing unit (CPU), or the processor may further be another general-purpose processor, a digital signal processor (DSP), an application-specific integrated circuit (ASIC), a field programmable gate array (FPGA), another programmable logic device, a discrete gate or a transistor logic device, a discrete hardware component, or the like. The general-purpose processor may be a microprocessor, or the processor may be any conventional processor or the like.

According to the method provided in embodiments of this application, this application further provides a computer program product. The computer program product includes computer program code. When the computer program code is executed on a computer, the computer is enabled to perform the method on a terminal device side in any one of the foregoing method embodiments.

According to the method provided in embodiments of this application, this application further provides a computer-readable medium. The computer-readable medium stores program code. When the program code is executed on a computer, the computer is enabled to perform the method on a source transport layer proxy network element side in the foregoing method embodiments.

According to the method provided in embodiments of this application, this application further provides a computer-readable medium. The computer-readable medium stores program code. When the program code is executed on a computer, the computer is enabled to perform the method on a target transport layer proxy network element side in the foregoing method embodiments.

According to the method provided in embodiments of this application, this application further provides a computer-readable medium. The computer-readable medium stores program code. When the program code is executed on a computer, the computer is enabled to perform the method on a first application server side in the foregoing method embodiments.

According to the method provided in embodiments of this application, this application further provides a computer-readable medium. The computer-readable medium stores program code. When the program code is executed on a computer, the computer is enabled to perform the method on a second application server side in the foregoing method embodiments.

According to the method provided in embodiments of this application, this application further provides a computer-readable medium. The computer-readable medium stores program code. When the program code is executed on a computer, the computer is enabled to perform the method on a session management network element side in the foregoing method embodiments.

According to the method provided in embodiments of this application, this application further provides a system, including at least one of the foregoing terminal device, source transport layer proxy network element, target transport layer proxy network element, first application server, second application server, and session management network element.

An embodiment of this application further provides a processing apparatus, including a processor and an interface. The processor is configured to perform the method in any one of the foregoing method embodiments.

It should be understood that the processing apparatus may be a chip. For example, the processing apparatus may be a field programmable gate array (FPGA), may be a general-purpose processor, a digital signal processor (DSP), an application-specific integrated circuit (ASIC), the field programmable gate array (FPGA), another programmable logic device, a discrete gate or a transistor logic device, a discrete hardware component, a system on chip (SoC), a central processing unit (CPU), a network processor (NP), a digital signal processing circuit (digital signal processor, DSP), a microcontroller unit (MCU), a programmable controller (PLD), or another integrated chip. The processor may implement or perform the methods, steps, and logical block diagrams that are disclosed in embodiments of this application. The general-purpose processor may be a microprocessor, or the processor may be any conventional processor or the like. The steps of the methods disclosed with reference to embodiments of this application may be directly presented as being performed and completed by a hardware decoding processor, or performed and completed by a combination of hardware and a software module in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external buffer. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM). It should be noted that the memory in the system and the method described in this specification is intended to include but is not limited to these memories and any memory of another proper type.

All or some of the foregoing embodiments may be implemented by using software, hardware, firmware, or any combination thereof. When the software is used to implement the embodiments, the embodiments may be implemented all or partially in a form of a computer program product. The computer program product includes one or more computer instructions. When the computer instructions are loaded and executed on a computer, the procedures or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments completely correspond to the network device and the terminal device in the method embodiments. A corresponding module or unit performs a corresponding step. For example, the communication unit (the transceiver) performs a receiving or sending step in the method embodiments, and a step other than the sending step and the receiving step may be performed by the processing unit (the processor). For a function of a specific unit, refer to a corresponding method embodiment. There may be one or more processors.

The terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, a thread of execution, a program, or a computer. As illustrated by using figures, both a computing device and an application that runs on the computing device may be components. One or more components may reside within a process or a thread of execution, and a component may be located on one computer or distributed between two or more computers. In addition, these components may be executed from various computer-readable media that store various data structures. For example, the components may communicate by using a local or remote process, for example, based on a signal having one or more data packets (for example, data from two components interacting with another component in a local system, a distributed system, or across a network such as the internet interacting with another system by using the signal).

It should be understood that, an "embodiment" mentioned throughout this specification means that particular features, structures, or characteristics related to the embodiment are included in at least one embodiment of this application. Therefore, embodiments in the entire specification are not necessarily same embodiments. In addition, the particular features, structures, or characteristics may be combined in one or more embodiments by using any appropriate manner.

It should be understood that, in embodiments of this application, numbers "first", "second", and the like are merely used to distinguish between different objects, for example, to distinguish between different network devices, and do not constitute a limitation on the scope of embodiments of this application. Embodiments of this application are not limited thereto.

It should be further understood that, in this application, "when" and "if" mean that a network element performs corresponding processing in an objective situation, and are not intended to limit time, and the network element is not necessarily required to have a determining action during implementation, and do not mean any other limitation.

It should be further understood that in embodiments of this application, "B corresponding to A" indicates that B is associated with A, and B may be determined based on A. However, it should be further understood that determining B based on A does not mean that B is determined based only on A. B may alternatively be determined based on A and/or other information.

It should also be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

Unless otherwise specified, an expression used in this application similar to an expression that "an item includes one or more of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

It may be understood that in embodiments of this application, the terminal device and/or the network device may perform some or all steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application are necessarily to be performed.

A person of ordinary skill in the art may be aware that, in combination with the examples described in embodiments disclosed in this specification, units and algorithm steps may be implemented by electronic hardware or a combination of computer software and electronic hardware. Whether functions are performed by hardware or software depends on particular applications and design constraints of the technical solutions. A person skilled in the art may use a different method to implement the described functions for each particular application, but it should not be considered that the implementation goes beyond the scope of this application.

A person skilled in the art may clearly understand that, for the purpose of convenient and brief descriptions, for detailed working processes of the foregoing systems, apparatuses, and units, refer to corresponding processes in the foregoing method embodiments. Details are not described herein again.

In the several embodiments provided in this application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium, and includes several instructions for indicating a computer device (which may be a personal computer, a server, a network device, or the like) to perform all or some of the steps of the methods described in embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A communication apparatus, wherein the communication apparatus is a target transport layer proxy network element or is a chip for the target transport layer proxy network element, and wherein the communication apparatus comprises a processor, wherein the processor is coupled to a memory, and the memory is configured to store a program or instructions; and when the program or the instructions is/are executed by the processor, the apparatus is enabled to perform operations comprising:
   establishing a fourth transport layer connection based on a first context of a source transport layer proxy network element, wherein the first context is a context about packet transmission of the source transport layer proxy network element on a first path; and
   based on receiving first indication information, and the first indication information being used to indicate that application context migration between a first application server and a second application server is completed, performing transport layer processing on a packet on a second path based on a second context of the target transport layer proxy network element, and transmitting, on the second path, a packet obtained through the transport layer processing, wherein the second path comprises a third transport layer connection and the fourth transport layer connection; the second context is determined based on the first context and the fourth transport layer connection; when the application context migration is being performed, packet transmission between the first application server and a transport layer proxy network element is stopped; and the transport layer proxy network element comprises the source transport layer proxy network element or the target transport layer proxy network element, wherein
   the first path is a path established between a terminal device and the first application server, the first path comprises a first transport layer connection and a second transport layer connection, the first transport layer connection is a transport layer connection between the source transport layer proxy network element and the terminal device, the second transport layer connection is a transport layer connection between the source transport layer proxy network element and the first application server, the third transport layer connection is a transport layer connection between the target transport layer proxy network element and the terminal device, and the fourth transport layer connection is a transport layer connection between the target transport layer proxy network element and the second application server.

2. The communication apparatus according to claim 1, wherein when the program or the instructions is/are executed by the processor, the apparatus is enabled to perform the operations further comprising:
   receiving a first uplink transmission control protocol (TCP) packet and a first downlink multipath transmission control protocol (MPTCP) packet from the source transport layer proxy network element, wherein the first uplink TCP packet is a packet that is received by the source transport layer proxy network element but that is not sent to the first application server, and the first downlink MPTCP packet is a packet that is received by the source transport layer proxy network element but that is not sent to the terminal device;
   encapsulating the first uplink TCP packet into a first uplink MPTCP packet based on the second context, and sending the first uplink MPTCP packet to the second application server through the fourth transport layer connection; and
   encapsulating the first downlink MPTCP packet into a first downlink TCP packet based on the second context of the target transport layer proxy network element, and sending the first downlink TCP packet to the terminal device through the third transport layer connection.

3. The communication apparatus according to claim 1, wherein when the program or the instructions is/are executed by the processor, the apparatus is enabled to perform the operations further comprising:
   receiving a notification message from a session management network element, wherein the notification message is used to indicate that the target transport layer proxy network element is to start performing transport layer processing on a packet, and the notification message comprises the first context.

4. The communication apparatus according to claim 1, wherein when the program or the instructions is/are executed by the processor, the apparatus is enabled to perform the operations further comprising:
   before receiving first indication information,
   performing transport layer processing on a packet on a third path based on the first context, and transmitting, on the third path, a packet obtained through the transport layer processing, wherein the third path is a path established between the terminal device and the first application server, the third path comprises the third transport layer connection and a fifth transport layer connection, the fifth transport layer connection is a transport layer connection between the target transport layer proxy network element and the first application server, and the fifth transport layer connection passes through the source transport layer proxy network element; and
   based on receiving second indication information sent by the first application server, stopping sending data to the first application server, wherein the second indication information is sent when the first application server is to start performing application context migration between the first application server and the second application server.

5. The communication apparatus according to claim 4, wherein when the program or the instructions is/are executed by the processor, the apparatus is enabled to perform the operations further comprising:

receiving a second uplink transmission control protocol (TCP) packet and a second downlink multipath transmission control protocol (MPTCP) packet from the source transport layer proxy network element, wherein the second uplink TCP packet is a packet that is received by the source transport layer proxy network element but that is not sent to the first application server, and the second downlink MPTCP packet is a packet that is received by the source transport layer proxy network element but that is not sent to the terminal device;

encapsulating the second uplink TCP packet into a second uplink MPTCP packet based on the first context, and sending the second uplink MPTCP packet to the first application server through the fifth transport layer connection via the source transport layer proxy network element; and encapsulating the second downlink MPTCP packet into a second downlink TCP packet based on the first context, and sending the second downlink TCP packet to the terminal device through the third transport layer connection.

6. The communication apparatus according to claim 1, wherein the first context comprises a first transport layer connection parameter and a second transport layer connection parameter, and the first transport layer connection parameter and the second transport layer connection parameter are used to perform transport layer processing; or the first context comprises a first transport layer connection parameter, a first transmission state parameter, a second transport layer connection parameter, and a second transmission state parameter, the first transport layer connection parameter and the second transport layer connection parameter are used to perform transport layer processing, the first transmission state parameter is used to indicate a packet transmission state of the first transport layer connection, and the second transmission state parameter is used to indicate a packet transmission state of the second transport layer connection.

7. A communication apparatus, wherein the communication apparatus is a source transport layer proxy network element or is a chip for the source transport layer proxy network element, and wherein the communication apparatus comprises a processor, wherein the processor is coupled to a memory, and the memory is configured to store a program or instructions; and when the program or the instructions is/are executed by the processor, the apparatus is enabled to perform operations comprising:

based on receiving third indication information, stopping performing transport layer processing on a packet on a first path based on a first context of the source transport layer proxy network element, wherein the first context is a context about packet transmission of the source transport layer proxy network element on the first path, wherein the first context is used by a target transport layer proxy network element to establish a fourth transport layer connection; based on receiving first indication information, the target transport layer proxy network element performs transport layer processing on a packet on a second path based on a second context of the target transport layer proxy network element; the second context is determined based on the first context and a context of the fourth transport layer connection; the first indication information is used to indicate that application context migration between a first application server and a second application server is completed; when the application context migration is being performed, packet transmission between the first application server and a proxy network element is stopped; and the proxy network element comprises the source transport layer proxy network element or the target transport layer proxy network element; and the first path is a path established between a terminal device and the first application server, the first path comprises a first transport layer connection and a second transport layer connection, the first transport layer connection is a transport layer connection between the source transport layer proxy network element and the terminal device, the second transport layer connection is a transport layer connection between the source transport layer proxy network element and the first application server, the second path comprises a third transport layer connection and the fourth transport layer connection, the third transport layer connection is a transport layer connection between the target transport layer proxy network element and the terminal device, and the fourth transport layer connection is a transport layer connection between the target transport layer proxy network element and the second application server.

8. The communication apparatus according to claim 7, wherein when the program or the instructions is/are executed by the processor, the apparatus is enabled to perform the operations further comprising:

sending a migration complete instruction to a session management network element, wherein the migration complete instruction is used to indicate that the source transport layer proxy network element has stopped performing transport layer processing on a packet and that the target transport layer proxy network element has started performing transport layer processing on a packet, and the migration complete instruction is used by the session management network element to trigger the application context migration between the first application server and the second application server.

9. The communication apparatus according to claim 7, wherein when the program or the instructions is/are executed by the processor, the apparatus is enabled to perform the operations further comprising:

before the stopping performing transport layer processing on a packet on a first path based on a first context of the source transport layer proxy network element, detecting whether a third uplink packet is an uplink multipath transmission control protocol (MPTCP) packet, wherein the third uplink packet is an uplink packet from the target transport layer proxy network element to the first application server via the source transport layer proxy network element; and determining that the third uplink packet is the uplink MPTCP packet.

10. The communication apparatus according to claim 7, wherein when the program or the instructions is/are executed by the processor, the apparatus is enabled to perform the operations further comprising:

sending a first uplink transmission control protocol (TCP) packet and a first downlink multipath transmission control protocol (MPTCP) packet to the target transport layer proxy network element for transport layer processing, wherein the first uplink TCP packet is a packet that is received by the source transport layer proxy network element but that is not sent to the first application server, and the first downlink MPTCP packet is a packet that is received by the source transport layer proxy network element but that is not sent to the terminal device.

11. The communication apparatus according to claim 10, wherein when the program or the instructions is/are executed by the processor, the apparatus is enabled to perform the operations further comprising:
before the sending a first uplink TCP packet and a first downlink MPTCP packet to the target transport layer proxy network element;
based on receiving fourth indication information, stopping sending data to the first application server, wherein the fourth indication information is sent when the first application server is to start performing application context migration between the first application server and the second application server.

12. The communication apparatus according to claim 10, wherein when the program or the instructions is/are executed by the processor, the apparatus is enabled to perform the operations further comprising:
sending the first context to the session management network element.

13. A packet transmission method, comprising:
based on a source transport layer proxy network element receiving third indication information, stopping performing, by the source transport layer proxy network element, transport layer processing on a packet on a first path based on a first context of the source transport layer proxy network element, wherein the first context is a context about packet transmission of the source transport layer proxy network element on the first path;
establishing, by a target transport layer proxy network element, a fourth transport layer connection based on the first context; and
based on the target transport layer proxy network element receiving first indication information, and the first indication information being used to indicate that application context migration between a first application server and a second application server is completed, performing, by the target transport layer proxy network element, transport layer processing on a packet on a second path based on a second context of the target transport layer proxy network element, and transmitting, on the second path, a packet obtained through the transport layer processing, wherein the second path comprises a third transport layer connection and the fourth transport layer connection; the second context is determined based on the first context and a context of the fourth transport layer connection; when the application context migration is being performed, packet transmission between the first application server and a transport layer proxy network element is stopped; and the transport layer proxy network element comprises the source transport layer proxy network element or the target transport layer proxy network element, wherein the first path is a path established between a terminal device and the first application server,
the first path comprises a first transport layer connection and a second transport layer connection, the first transport layer connection is a transport layer connection between the source transport layer proxy network element and the terminal device, the second transport layer connection is a transport layer connection between the source transport layer proxy network element and the first application server, the third transport layer connection is a transport layer connection between the target transport layer proxy network element and the terminal device, and the fourth transport layer connection is a transport layer connection between the target transport layer proxy network element and the second application server.

14. The method according to claim 13, wherein the method further comprises:
sending, by the source transport layer proxy network element, a first uplink transmission control protocol (TCP) packet and a first downlink multipath transmission control protocol (MPTCP) packet to the target transport layer proxy network element for transport layer processing, wherein the first uplink TCP packet is a packet that is received by the source transport layer proxy network element but that is not sent to the first application server, and the first downlink MPTCP packet is a packet that is received by the source transport layer proxy network element but that is not sent to the terminal device;
encapsulating, by the target transport layer proxy network element, the first uplink TCP packet into a first uplink MPTCP packet based on the second context, and sending the first uplink MPTCP packet to the second application server through the fourth transport layer connection; and
encapsulating, by the target transport layer proxy network element, the first downlink MPTCP packet into a first downlink TCP packet based on the second context of the target transport layer proxy network element, and sending the first downlink TCP packet to the terminal device through the third transport layer connection.

15. The method according to claim 13, wherein the first context comprises a first transport layer connection parameter and a second transport layer connection parameter, and the first transport layer connection parameter and the second transport layer connection parameter are used to perform transport layer processing; or
the first context comprises a first transport layer connection parameter, a first transmission state parameter, a second transport layer connection parameter, and a second transmission state parameter, the first transport layer connection parameter and the second transport layer connection parameter are used to perform transport layer processing, the first transmission state parameter is used to indicate a packet transmission state of the first transport layer connection, and the second transmission state parameter is used to indicate a packet transmission state of the second transport layer connection.

16. A communication system, wherein the communication system comprises a source transport layer proxy network device and a target transport layer proxy network device, wherein the source transport layer proxy network device is a hardware device including a processor and the target transport layer proxy network device is a hardware device including a processor, wherein
the source transport layer proxy network device is configured to: based on receiving third indication information, stop performing transport layer processing on a packet on a first path based on a first context of the source transport layer proxy network device, wherein the first context is a context about packet transmission of the source transport layer proxy network device on the first path; and
the target transport layer proxy network device is configured to: establish a fourth transport layer connection based on the first context; based on first indication information being received, and the first indication information being used to indicate that application context migration between a first application server and a second application server is completed, perform transport layer processing on a packet on a second path based on a second context of the target transport layer proxy network device; and transmit, on the second path, a packet obtained through the transport layer processing, wherein the second path comprises a third transport layer connection and the fourth transport layer connection; the second context is determined based on the first context and the fourth transport layer connection; when the application context migration is being performed, packet transmission between the first application server and a transport layer proxy network device is stopped; and the transport layer proxy network device comprises the source transport layer proxy network device or the target transport layer proxy network device, wherein the first path is a path established between a terminal device and the first application server, the first path comprises a first transport layer connection and a second transport layer connection, the first transport layer connection is a transport layer connection between the source transport layer proxy network device and the terminal device, the second transport layer connection is a transport layer connection between the source transport layer proxy network device and the first application server, the third transport layer connection is a transport layer connection between the target transport layer proxy network device and the terminal device, and the fourth transport layer connection is a transport layer connection between the target transport layer proxy network device and the second application server.

17. The system according to claim 16, wherein the source transport layer proxy network device is further configured to:

send a first uplink transmission control protocol (TCP) packet and a first downlink multipath transmission control protocol (MPTCP) packet to the target transport layer proxy network device for transport layer processing, wherein the first uplink TCP packet is a packet that is received by the source transport layer proxy network device but that is not sent to the first application server, and the first downlink MPTCP packet is a packet that is received by the source transport layer proxy network device but that is not sent to the terminal device; and wherein the target transport layer proxy network device is further configured to:

encapsulate the first uplink TCP packet into a first uplink MPTCP packet based on the second context, and sending the first uplink MPTCP packet to the second application server through the fourth transport layer connection; and encapsulate the first downlink MPTCP packet into a first downlink TCP packet based on the second context of the target transport layer proxy network device, and sending the first downlink TCP packet to the terminal device through the third transport layer connection.

18. The system according to claim 16, wherein the first context comprises a first transport layer connection parameter and a second transport layer connection parameter, and the first transport layer connection parameter and the second transport layer connection parameter are used to perform transport layer processing; or the first context comprises a first transport layer connection parameter, a first transmission state parameter, a second transport layer connection parameter, and a second transmission state parameter, the first transport layer connection parameter and the second transport layer connection parameter are used to perform transport layer processing, the first transmission state parameter is used to indicate a packet transmission state of the first transport layer connection, and the second transmission state parameter is used to indicate a packet transmission state of the second transport layer connection.

19. The system according to claim 16, wherein the system further comprises the first application server and the second application server, wherein the first application server is configured to: perform application context migration between the first application server and the second application server based on receiving an application migration instruction, wherein the application migration instruction is triggered when it is determined that the source transport layer proxy network device has stopped performing transport layer processing on a packet and that the target transport layer proxy network device has started performing transport layer processing on a packet.

20. The system according to claim 16, wherein the system further comprises a session management network device, wherein the session management network device is configured to: receive the first context from the source transport layer proxy network device, and send the first context to the target transport layer proxy network device.

* * * * *